United States Patent [19]
Kask et al.

[11] Patent Number: 6,144,896
[45] Date of Patent: Nov. 7, 2000

[54] METHOD AND APPARATUS FOR DESIGNING SHEET METAL PARTS

[75] Inventors: Kalev Kask; Jun-Shiou Ou; Dmitry Leshchiner, all of Irvine; Kensuke Hazama, Yorba Linda, all of Calif.

[73] Assignee: Amada Metrecs Company, Limited, Kanagawa, Japan

[21] Appl. No.: 09/034,401

[22] Filed: Mar. 4, 1998

[51] Int. Cl.[7] .................. G06F 19/00; G05B 19/4097
[52] U.S. Cl. .................. 700/182; 700/165; 700/98
[58] Field of Search .................. 700/145, 165, 700/182, 95, 97, 98, 103, 206, 178; 345/419, 420

[56] References Cited

U.S. PATENT DOCUMENTS

| | | | |
|---|---|---|---|
| 5,396,265 | 3/1995 | Ulrich et al. | 345/158 |
| 5,760,419 | 6/1998 | Nabiev et al. | 700/21 |
| 5,828,575 | 10/1998 | Sakai | 700/182 |
| 5,864,482 | 1/1999 | Hazama et al. | 700/95 |
| 5,886,897 | 3/1999 | Hazama et al. | 700/182 |
| 5,971,589 | 10/1999 | Hazama et al. | 700/145 |

OTHER PUBLICATIONS

Copy of "Computer Graphics and Object Oriented Approach to the Art and Science" by Cornel Pokorny, published 1994, pp. 523–526.

*Primary Examiner*—William Grant
*Assistant Examiner*—Kidest Bahta
*Attorney, Agent, or Firm*—Greenblum & Bernstein, P.L.C.

[57] ABSTRACT

An apparatus is provided for resolving a collision between a first face and a second face of a sheet metal part represented by a 3-D model. The faces collide with one another when a 2-D model of a flat sheet metal part, designed on a CAD system, is folded into the 3-D model displayed on the CAD system. The apparatus comprises a detecting means, an analyzing means and an eliminating means. The detecting means is for detecting each collision between the faces which become adjacent in association with folding the 2-D model into the 3-D model. The eliminating means is for eliminating the collision by designing a 2-D model of a modified flat sheet metal part which can be folded without causing the collision.

19 Claims, 26 Drawing Sheets

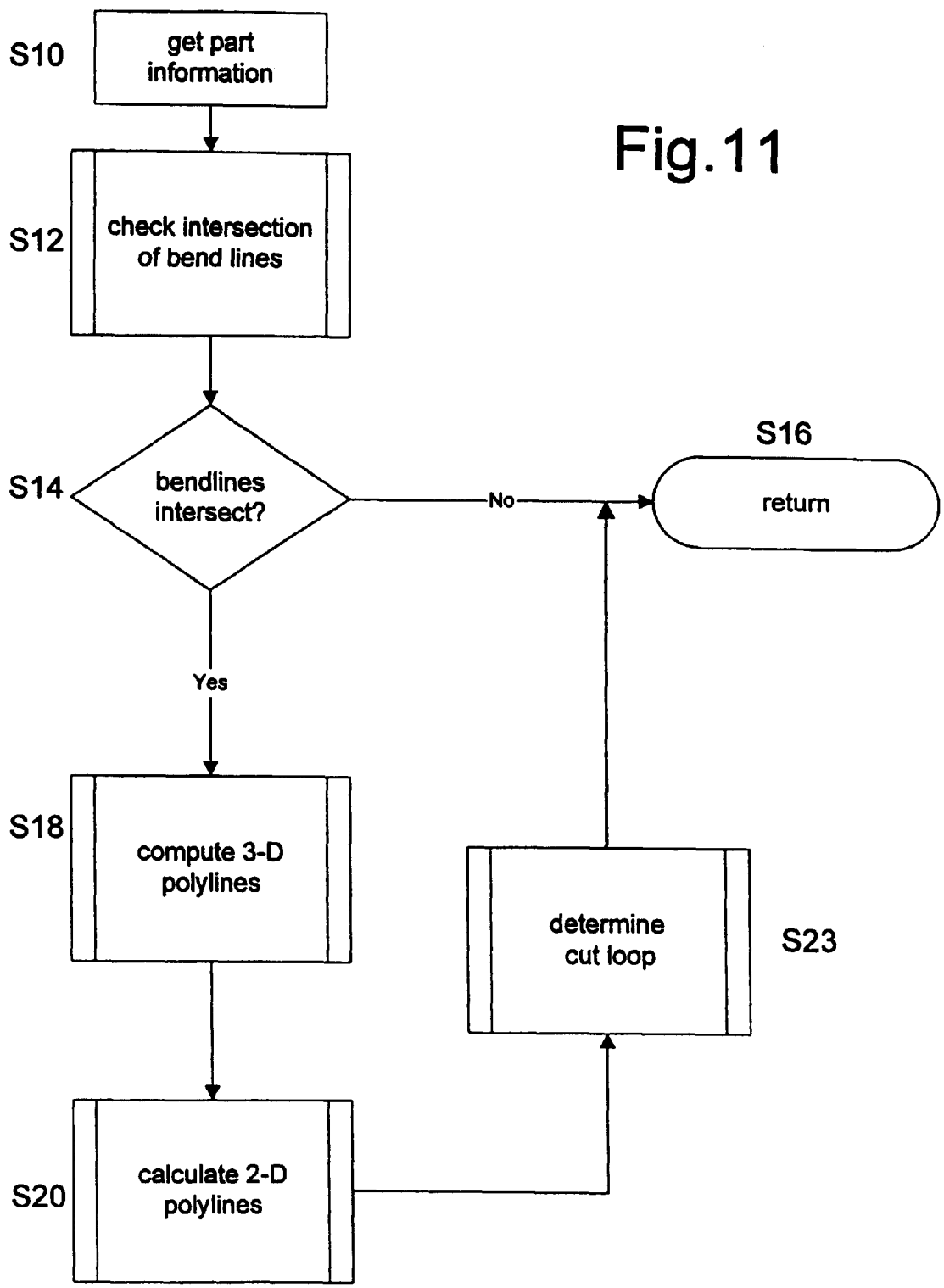

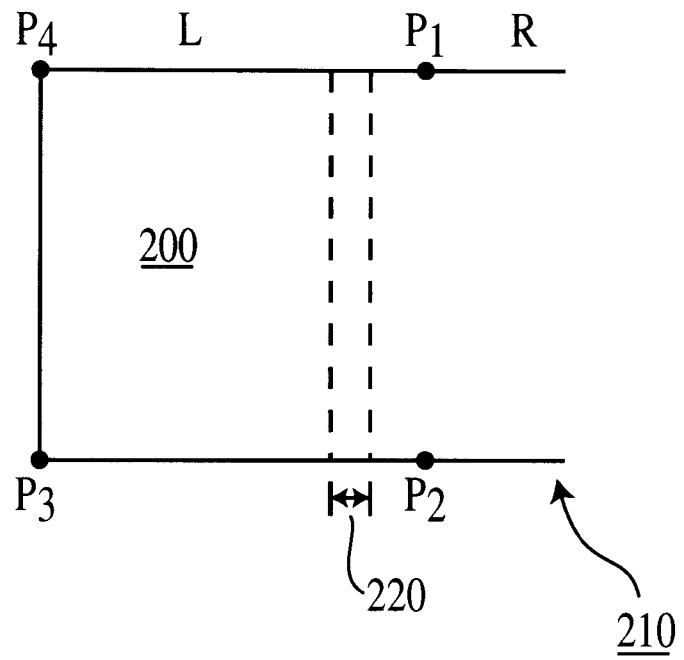
FIG. 14a
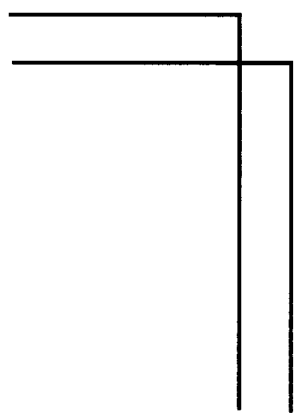 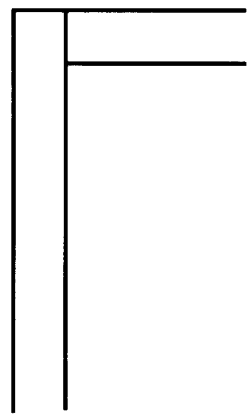
FIG. 14b  FIG. 14c

METHOD AND APPARATUS FOR DESIGNING SHEET METAL PARTS

BACKGROUND OF THE INVENTION

1. Field of the Invention

The present invention relates to an apparatus and method for designing a sheet metal part using a computer aided design (CAD) system. More particularly, the present invention relates to an apparatus and method for designing a flat sheet metal part to be folded or bent into a user specified part (three dimensional part) having smooth, finished corners with no overlapping of faces or spaces between adjacent faces after bending.

2. Background Information

Typically, in order to create a finished folded or bent sheet metal part from a flat sheet metal part (flat), a user develops a three-dimensional (3-D) model of the desired finished sheet metal part on a computer system. From the three-dimensional model, a two-dimensional (2-D) model (flat sheet metal part) can be determined. The 2-D model shows bend lines necessary for folding the flat sheet metal part into the desired 3-D part using e.g., a die and punch, as well as the shape into which the flat should be cut prior to being bent. Then, using the 2-D model as a blueprint, the flat sheet metal part (flat) is cut to the specified shape. Subsequently, the flat is bent along the specified bend lines to create the desired finished part.

However, it is very difficult to design the flat such that smooth, finished corners result after bending because typically the part will have interference or collisions between faces which become adjacent after bending. The difficulty arises because the geometry modeling and the computation of the flat from the user specified 3-D part are complex. One reason for the complexity is that expansion or shrinking of the sheet metal occurs during bending which causes collision/interference to occur between adjacent bent surfaces. Adding to the complexity is the fact that different materials exhibit different expansion/shrinking properties. Consequently, as a result of the collisions the part will not bend properly or, if the sheet metal is thin, it will bend but warping will occur near the corners. Another problem is that surfaces (i.e., flanges) of the parts may overlap during bending and result in a rough transition between surfaces.

To solve these problems, traditional sheet metal part designers would design a rough flat for bending into the desired final part, and through a process of trial and error, the designer would redesign the part until the final part had smooth, finished corners. Alternatively, after folding the part, the colliding or overlapping sections may be trimmed. However, calculating the amount to trim often proves difficult due to the fact that the computation is quite complex.

Simple examples of this problem are illustrated in FIGS. 1–8. Note, the simple problems illustrated in FIGS. 1–8 do not require the complex calculations that a real part requires. These figures are used merely for explanation purposes. FIG. 1 shows a desired user selected 3-D sheet metal part 10. Based upon the specified 3-D part, a simplified flat sheet metal part 11 for bending into the 3-D part 10 can be designed as seen in FIG. 2. Bend lines 12 and 14 are then determined in order to be able to bend the flat into the required shape illustrated in FIG. 1.

However, due to shrinking or stretching of the sheet metal during the bending operation, a collision at a corner occurs and can cause warping of the sheet metal resulting in an undesired finished part. To eliminate the warping, traditionally, if the metal is thin, the colliding section 16 could be ground to make a smooth corner. Another traditional solution to the warping problem is to provide (i.e., cut) a circular relief hole 18 in the flat 11. However, the circular relief hole 18 which may be cut from the flat 11 is generally too large, leaving a gap at the corner formed by the bending. If the gap at the corner is not wanted, an extra step of welding is required to fill the gap left after the part is bent. If the user does not care about the gap, it may be left in the finished part 10. Therefore, it is apparent that a technique is needed for designing the flat sheet metal part 11 such that upon bending it, the corners will be smooth and finished without requiring additional processing operations.

Another traditional solution to this problem requires a rough trial and error process. The designer of the sheet metal part designs the flat 11 through a trial and error process to achieve a folded part 10 having a smooth, finished corner. However, the trial and error process has multiple drawbacks, most notably the use of multiple flats for each trial which must be discarded after one use and the expending of excessive time. Thus, there is a need for a quick and efficient way to design a flat sheet metal part in order to prevent overlap or collisions so as to result in a smooth, finished 3-D sheet metal part.

FIGS. 3 and 4 illustrate a face overlap problem encountered when constructing a box 10 from a sheet metal flat 11. For the box 10 to be finished, faces 21, 23 should come together exactly along a single line when the flat 11 is folded along bend lines 20, 22 without any overlapping section 24. However, because calculating how to design the flat 11 such that faces 21, 23 meet without the overlapping section 24 is complex, typically a designer lets the faces overlap and then determines how much to trim the faces 21, 23 afterwards. Thus, when the flat 11 is folded, and the overlapping section 24 exists, the traditional solution requires unfolding the part and trimming the faces 21, 23 where the overlap occurs. Then the box is refolded to see if the overlap is eliminated. If not, this process is repeated until a finished box results without an overlapping section 24. However, this trial and error process is quite time consuming. Therefore, a need exists for a system which quickly and efficiently designs a flat such that face overlap is eliminated.

FIGS. 5 and 6 illustrate another problem encountered with sheet metal design. When the flat sheet metal part 11 shown in FIG. 6 is bent along bend lines 12 and 14, if the faces 26, 28 (FIG. 5) are non-parallel relative to one another and thus do not touch after bending, gaps are created between faces 26 and 28 thus leaving an undesirable gap in the corner. Traditionally, this problem is solved by having the designer compute the shape of the 2-D flat 11 to compensate for the gap. However, if the designer overcompensates, interference will occur necessitating trim. Or it may even be necessary to fashion another flat 11, if for instance, the interference is so large as to prevent bending. On the other hand, if the designer undercompensates, an undesired gap will still remain. Thus, the calculation necessary for designing the flat having the proper shape to compensate for the non-touching is critical. However, such computations are quite complex. The calculation becomes even more complicated when the thickness of the metal is accounted for, and how much, if any, face contact is desired in the corners. Not only does the calculation take an enormous amount of time and effort, but proper calculation requires the designer to perfectly input the exact geometry of the 3-D part. This can be very difficult and time consuming. Thus, a need exists for a method for designing a flat sheet metal part to create tight, closed corners when sheet metal parts having non-parallel faces are bent without requiring a great effort from the part designer.

Another problem encountered with sheet metal design is illustrated in FIGS. 7 and 8. When the sheet metal part 10 shown in FIG. 7 is bent along bend lines 12, 14 and 32, particularly when the bend along bend line 32 occurs, faces 26 and 30 interfere with each other. The interference or overlap prevents a smooth transition between faces, producing an unfinished or rough, unprofessional looking end product. Traditionally, this problem is solved similarly to the previously described problems through trial and error trimming of both faces or of either face. Alternatively, complicated calculations are necessary to determine the optimum shape of the flat part in order to obtain a smooth corner. Similar to above, the calculation is very complicated, and takes an inordinate amount of time and effort. Thus, there is a need for a system in which a flat part can be designed in order to create a smooth, finished 3-D user specified sheet metal part.

SUMMARY OF THE INVENTION

In view of the foregoing, the present invention, through one or more of its various aspects, embodiments and/or specific features or sub-components, is thus intended to bring about one or more of the advantages as specifically noted below.

According to a preferred embodiment of the present invention an apparatus is provided for resolving a collision between a first face and a second face of a sheet metal part represented by a 3-D model. The faces collide with one another when a 2-D model of a flat sheet metal part, designed on a CAD system, is folded into the 3-D model displayed on the CAD system. The apparatus comprises a detecting system, an analyzing system, and an eliminating system. The detecting system is for detecting each collision between faces which become adjacent in association with folding the 2-D model into the 3-D model. The eliminating system is for eliminating the collision by designing a 2-D model of a modified flat sheet metal part which can be folded without causing the collision.

According to a preferred embodiment, the analyzing system comprises a polyline computing system for computing polylines corresponding to a collision area. Moreover, the analyzing system further comprises a cut-loop computing system for computing a cut-loop from the polylines. The eliminating system comprises a removing system for using the cut-loop to remove a portion of the 2-D model of the flat sheet metal part. The polyline computing system may also compensate for an amount of expansion/shrinking of the part during a bending operation. The computing system may compute the polyline by modeling a bend line as an imaginary cylinder to analyze intersection points on colliding faces.

According to another preferred embodiment of the present invention, the analyzing system comprises a bounding box computing system for computing a bounding box for a collision area corresponding to each face. The analyzing system may also comprise an extended bounding box computing system for computing an extended bounding box from the bounding box. Moreover, the eliminating system may comprise a trim-loop computing system for computing a trim-loop based upon the extended bounding box and user input parameters relating to selection of cut type. The eliminating system may further comprise a computing system for computing a first intersection area between the first face and the second face's trim-loop and removing the first intersection area from the first face, and for computing a second intersection area between the second face and the first face's trim-loop and removing the second intersection area from the second face.

According to another preferred embodiment of the present invention the analyzing system may classify the collision into at least one of face overlap, setback and 3-D trim and control the eliminating system in accord with the classification. If the collision is classified as 3-D trim or setback, a trim-loop calculating system calculates a trim-loop including a collision area bounding box and an area to one side of the collision area bounding box. Moreover, a cutting system is provided for cutting each face with the trim-loop to create a cut out piece, and a testing system is provided for testing the cut out piece for intersection with a hole and bend line in the 3-D part model. The eliminating system may further comprise a modifying system for modifying the trim-loop if it is near a bend line.

If the collision is classified as setback, a comparing system compares the cut out piece with a predetermined multiple of the sheet metal's thickness. If the collision is classified as 3-D trim, an enlarging system enlarges the trim-loop so that the trim-loop is larger in one dimension than the largest dimension of the face.

According to another embodiment of the present invention, an apparatus is provided for enabling smooth transitions between faces of a sheet metal part, represented by a 3-D model, when a 2-D model of a flat sheet metal part, designed on a CAD system, is folded into the 3-D model displayed on the CAD system. The apparatus may comprise an analyzing system and an eliminating system. The analyzing system analyzes a gap between faces which become proximate to each other in association with folding the 2-D model into the 3-D model. The eliminating system eliminates the gap by designing a 2-D model of a modified flat sheet metal part which can be folded without resulting in the gap.

According to another preferred embodiment of the present invention, the analyzing system may further comprise a selection system for selecting an edge of a first face to extend, a target face to which the first face will be extended, and an extension direction along which the edge of the first face will be extended to the target face.

Moreover, the eliminating system may comprise a calculating system for calculating a loop based on end points of the edge of the first face, the extension direction and the target face, and for calculating a new face including the first face and the loop. The extension direction may be either a direction tangent to the first face or a direction normal to the first face.

According to another embodiment of the present invention, a method is provided for enabling smooth transitions between faces of a sheet metal part, represented by a 3-D model, resulting from a 2-D model of a flat sheet metal part, designed on a CAD system, being folded into the 3-D model displayed on the CAD system. The method comprises detecting a collision between faces of the 3-D model which become adjacent in association with folding the 2-D model into the 3-D model, analyzing the collision, and eliminating the collision. The eliminating is accomplished by designing a 2-D model of a modified flat sheet metal part which can be folded into the 3-D model without resulting in the collision.

According to a preferred embodiment of the present invention, the analyzing comprises computing polylines, corresponding to a collision area, which compensate for an amount of expansion/shrinking of the part during a bending operation. The polylines are computed by modeling the intersecting bend lines with imaginary cylinders to analyze intersection points on colliding faces. The analyzing further comprises computing a cut-loop from the polylines. The eliminating comprises using the cut-loop to remove a portion of the 2-D model of the flat sheet metal part.

According to another preferred embodiment of the present invention, the analyzing comprises computing a bounding box for each face, enclosing a collision area corresponding to the respective face, and computing an extended bounding box for each face from the respective bounding boxes. The eliminating comprises computing a trim-loop for each face based upon the respective extended bounding box, and user input parameters relating to selection of cut type. The eliminating further comprises computing a first intersection area between the first face and the second face's trim-loop, removing the first intersection area from the first face, computing a second intersection area between the second face and the first face's trim-loop and removing the second intersection area from the second face.

According to another preferred embodiment of the present invention, the analyzing comprises classifying the collision into at least one of face overlap, setback and 3-D trim and controlling the eliminating in accordance with the classification. If the collision is classified as 3-D trim or setback, the analyzing further comprises calculating a trim-loop for each face which includes a collision area bounding box plus an area of the respective face to one side of the collision area bounding box, cutting the face with the trim-loop to create a cut out piece, and testing the cut out piece for an intersection with a hole and bend line in the 3-D part model. The eliminating further comprises modifying a trim-loop if it is near a bend line.

If the collision is classified as setback, the analyzing further comprises comparing the cut out piece with a predetermined multiple of the sheet metal's thickness. If the collision is classified as 3-D trim, the analyzing further comprises enlarging each face's trim-loop so that the trim-loop is larger in one dimension than a length and width of the face.

The above-listed features and advantages of the present invention will be more fully set forth below.

BRIEF DESCRIPTION OF THE DRAWINGS

The present invention is further described in the detailed description which follows, by reference to the noted drawings by way of non-limiting examples of preferred embodiments of the present invention, in which like reference numerals represent similar parts throughout the several views of the drawings, and wherein:

FIG. 11 is a flow diagram showing a preferred process for determining a cut loop to achieve a part having a two radius corner according to the present invention;

FIG. 14a is an elevation view showing a face having a hypothetical trim-loop constructed in accordance with the principles of the present invention;

FIG. 14b is a plan view showing an open corner according to the present invention;

FIG. 14c is a plan view showing a closed corner according to the present invention;

DETAILED DESCRIPTION OF THE PREFERRED EMBODIMENTS

According to a preferred embodiment of the present invention, a computer aided design (CAD) system is employed to design a user specified part based upon a user's specifications. Any CAD system may be used, although the AP100 system available from Amada Metrecs Company, Ltd. of Japan is preferred. After a computer model of the part is designed, a bending software system such as those disclosed in U.S. application Ser. Nos. 08/700,671, 08/690,671, 08/688,860 and 60/016,958, which are hereby incorporated by reference in their entirety, computes the rough shape of a flat sheet metal part (flat) for bending into the finished part. The CAD system and the bending software preferably run on a Pentium type processor system under a Windows NT operating system available from Microsoft Corporation. How to calculate a refined shape of the flat such that a finished part, comporting with the user's specification results and having a visually pleasing appearance, is now explained according to the features of the present invention. The results of the calculations which form part of the present invention will produce specifications for a flat sheet metal part to use in a cutting and bending apparatus for creating such a finished part.

Figure 9:
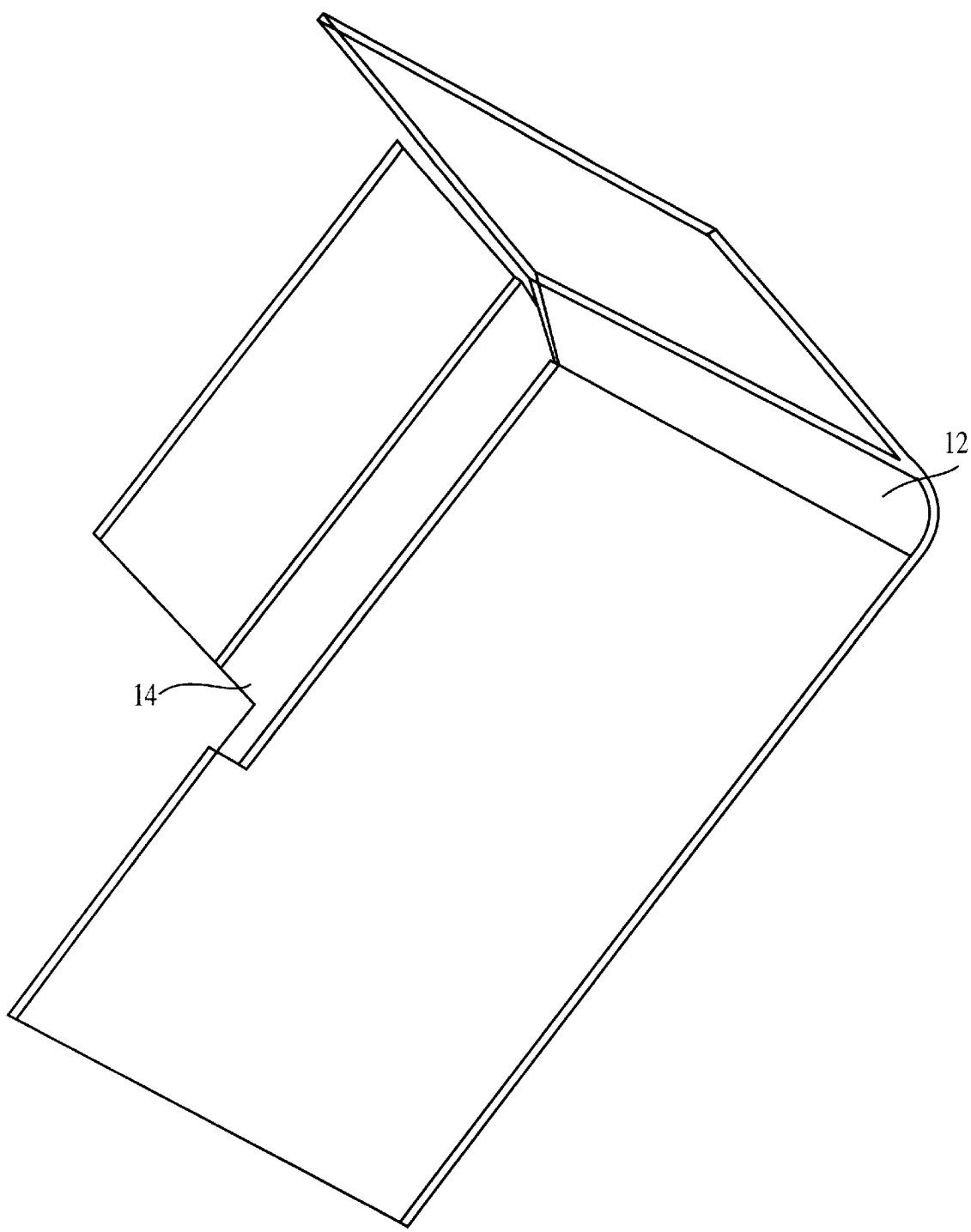
FIG. 9 is an illustration of a part having a smooth two radius corner designed in accordance with a system of the present invention.
Figure 10:
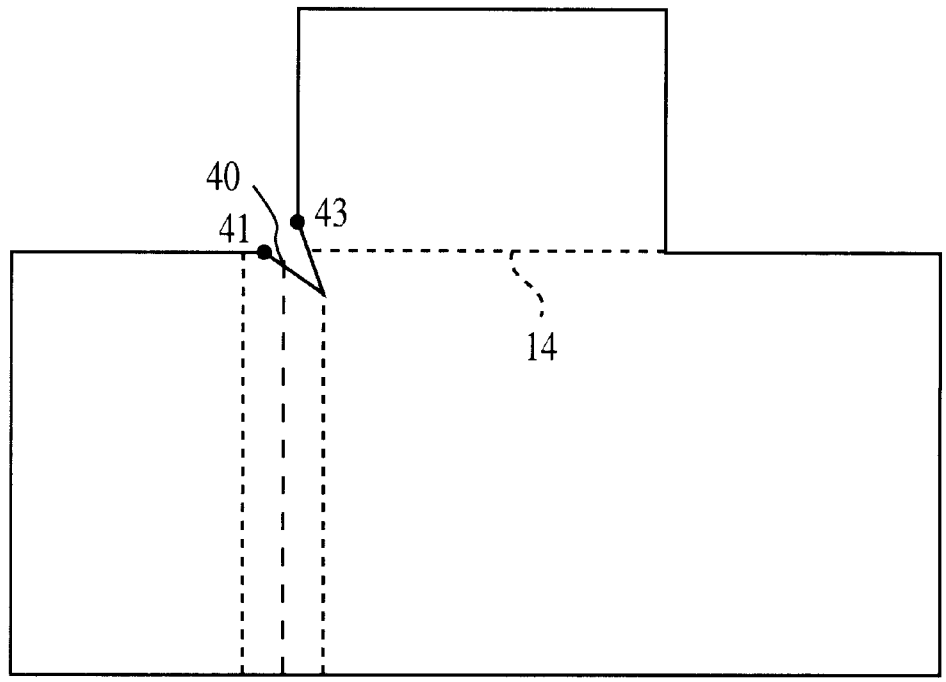
FIG. 10 is an illustration of a flat sheet metal part, for bending into the part shown in FIG. 9, designed according to a system of the present invention.

Referring to FIG. 9, a three-dimensional model of a sheet metal part having a finished, smooth corner (hereinafter referred to as a "two radius corner") is seen. FIG. 10 illustrates a 2-D model of a flat sheet metal part used in order to achieve the desired 3-D sheet metal part shown in FIG. 9. Thus, cutting along cut lines 40, 40' results in the smooth two radius corner when the part is folded along bend lines 12, 14. It is to be understood that when the term cutting, removing or similar terms are utilized, actual cutting is not performed, rather a simulated cut of the computer model occurs. Actual cutting occurs in the fabrication of the sheet metal part to be bent into the desired 3-D shape, in accordance with the specification developed by the present invention.

The process for determining the geometry of the cut line 40 is now described with reference to FIGS. 11–13. Initially, the function gets the geometry and other information describing the shape of the desired folded part and flat, including bend lines, at step S10. At step S12, each bend line is checked to see if it intersects with another bend line. The occurrence of an intersection can be determined and computed by any known means, e.g., by comparing the 3-D coordinates of each bend line for coincidence. At step S14, if it is determined that there are no bend line intersections, the logic returns to the calling routine at step S16. However, if at least one bend line intersection is found, at step S18 a pair of three-dimensional polylines is computed by a process described below with reference to FIG. 12. After the 3-D polylines are computed, at step S20 the three-dimensional part is unfolded and the polylines are converted to 2-D polylines as described below with reference to FIG. 13. When calculating 2-D polylines, the part is shrunk/expanded to compensate for the stretching/shrinking which would occur when the part is bent. Although the part may either shrink or expand depending on the material being bent, for simplicity the following discussion assumes the part expands when being bent. Thus, during unfolding, the part must be shrunk. Subsequently, at step S23, a cut loop is determined from the 2-D polylines, and the flat is modified or refined to include cut lines 40, 40'. Finally, at step S16, the logic returns to the calling function. Thus, the entire process of creating a three-dimensional part is done in reverse (i.e., using the 3-D part to define the flat) to determine the cut lines 40, 40' required to make a smooth two radius corner.

To determine how much to shrink the part, an inverse of a scaling factor used to expand the part while folding (bending) is used. A preferred embodiment for computing the scaling factor is now described using bend deductions, although any technique known in the bending art may be used. To compute the expansion, first a bend deduction for the bend line being analyzed is obtained from a lookup table. The bend deduction depends on the bending angle, and the material being bent. The information in the table is empirically determined, and is readily available. In fact, most bending machines have this information posted on the machines. According to the present invention, the bend deduction values are stored in the computer in a look-up table. Thus, the bend deduction represents the amount the dimension of the part changes when the part transforms between the 2-D flat and 3-D.

From the bend deduction, a bending region 13 shown in FIG. 10 is computed for the bend line being analyzed. The bending region 13 represents the contact area between a punch and the sheet metal i.e., the area of the part transformed during the bending process. The shape of the bending region 13 depends on the particular type of bending operation being executed. Normally, the bending region 13 has a cylindrical shape when the part is bent, and a rectangular shape when the part is flat, as seen in FIG. 10. From a bend angle and sheet metal thickness, the flat bending region 13 can be defined. The width of the flat bending region is equal to an arc length of a neutral line of the cylinder discussed below. Using the bend deduction, the expansion factor to expand the bending region is obtained to get the expanded bending region.

The expanded bending region 13 is then converted or transformed into a cylinder using the radius of a punch press contacting the sheet metal as the inner cylindrical radius, and the radius of the die as the outer cylindrical radius. Next, the intersection of the two cylindrical surfaces (representing the two intersecting bending regions of the intersecting bend lines, as determined in S14) is calculated. The intersection preferably is calculated using the inside surface of the cylinders, taking into account the thickness of the sheet metal. An exemplary algorithm for computing an intersection between a line and a cylinder may be found in *Computer Graphics an Object Oriented Approach to the Art and Science* by Comel Pokorny, published 1994, pages 524–526 which is hereby incorporated by reference. This algorithm may be easily modified for application to the present invention to calculate the intersection between two cylinders. Additional modifications required include creating an artificial cylinder (explained below) and expanding the calculated cylinder to a full 360 degree cylinder.

Figure 12:
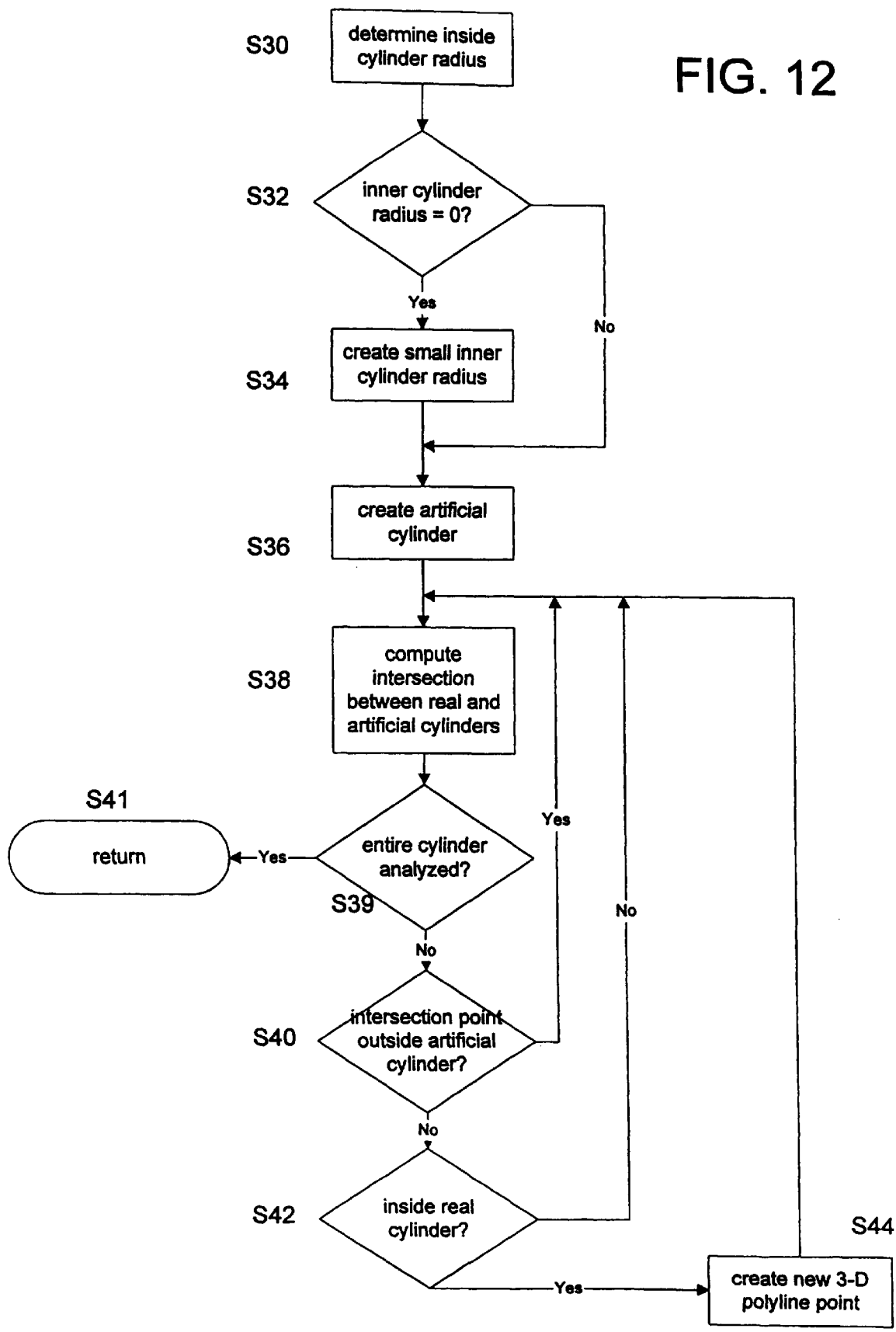
FIG. 12 is a flow diagram showing a preferred process for calculating a 3-D polyline according to the present invention.

With reference to FIG. 12, computation of the 3-D polylines is now explained. The following process is repeated for each bend line 12, 14 to obtain a pair of 3-D polylines. At step S30, the outside cylinder surface is determined and the inner cylinder surface is then determined based upon the outside cylinder surface and the thickness of the sheet metal.

In order to be able to perform the following analysis, at step S32, it is determined whether or not the inner cylinder radius equals 0 (e.g., if the user inputs a bend radius=0 in the part specification). At step S34, if the inner cylinder radius is equal to 0, a small inner cylinder radius is substituted to eliminate the use of zeros in the calculations. For example in a preferred embodiment, 0.1 times the radius of the outer cylinder is substituted for zero.

If the radius of the inner cylinder is not equal to 0, or after the small inner cylinder radius at step S34 is substituted, an artificial cylinder is created to approximate the real cylinder surface (which may have a rough end due to warping or user's specifications) at the point of interference to simplify calculation. The artificial cylinder is created by finding (e.g., by trial and error) the smallest standard cylinder which completely contains the real cylindrical surface.

Next, a determination is made as to where the real cylinders (representing the bend lines) intersect. Of course, if no intersection occurs, no warping will occur and no problem exists. Thus, at step S38, the intersection is calculated between the real cylinder representing the first bend line 12 and an extended artificial cylinder representing the second bend line 14 to get the polyline for the first bend line. The extended artificial cylinder is similar to the artificial cylinder just described, except it has an infinite length. According to a preferred embodiment of the present invention, to reduce calculating time, rather than analyzing each point on the end of the real cylinder, the end of the real cylinder being analyzed is divided into short arc segments and the analysis is performed at the end points of the arc segments.

Next, at step S39 it is determined whether the entire real cylinder has been analyzed for intersections. If the analysis is complete, at step S41 the logic returns to the calling function. Otherwise, if the analysis is not yet complete, the logic proceeds to step S40.

Once an intersection is found between the extended artificial cylinder and the real cylinder, it must be determined whether the intersection actually occurs between the two real cylinders. Therefore, at step S40, if an intersection occurs with the extended artificial cylinder, it is determined whether or not the intersection point is outside the artificial cylinder (non-extended). If the intersection point is outside the artificial cylinder (non-extended), the logic returns to step S38 because no intersection occurred between the two real cylinders. When an intersection point is found to be inside the artificial cylinder, it is determined whether or not the intersection point is inside the real cylinder at step S42. If at step S42 it is determined the intersection point is not inside the real cylinder, the logic returns to step S38 and proceeds as just described.

If, however, the intersection point is determined to be inside the real cylinder, the intersection point is set equal to a point on the 3-D polyline. This process is repeated for the entire arc length of the end of the cylinder until a set of points is found. The set of points are then connected to create the 3-D polyline for each bend line. The process is then repeated for the other bend line, resulting in a pair of 3-D polylines.

Figure 12A:
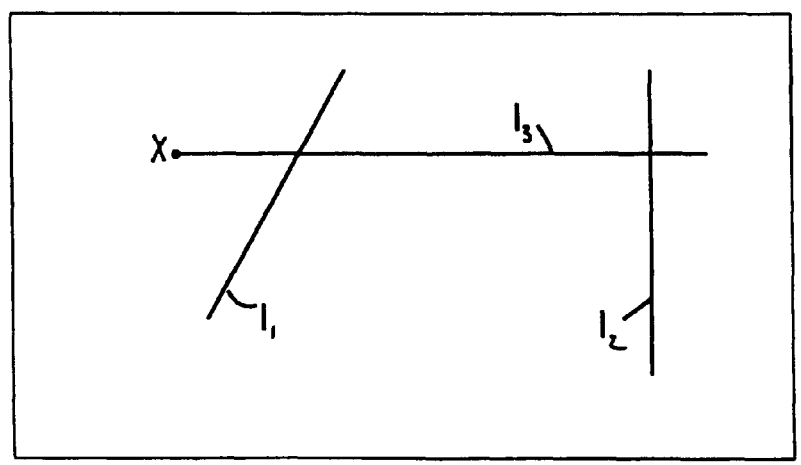
FIG. 12a is a top view showing a plane used for determining whether an intersection point is inside a real cylinder according to the present invention.

In order to determine if the intersection is inside the real cylinder, as briefly mentioned above, a plane is created including a point tangential to the artificial cylinder at the intersection point. Then, end points of arc segments representing both ends of the real cylinder are projected to the plane. FIG. 12*a* shows a top view of an exemplary plane P having the real cylinder ends projected thereto, shown as lines $l_1$, $l_2$.

The process of projecting the ends of the real cylinder to the plane P can be simplified into projecting four points to the plane P. In order to determine the four points, each end must first be divided into a number of arc segments. In a preferred embodiment, the user specifies the number of arc segments into which the cylinder end is divided. Then the arc segment containing the point of intersection X is determined. Subsequently, each end point of that arc segment is projected to the plane P and a line $l_1$, is drawn between those end points. Then, the arc segment on the other end of the cylinder corresponding to the arc segment containing the point of intersection, is determined and the end points of that arc segment are also projected to the plane. Finally, a line $l_2$ is drawn between those end points.

In order to determine if the intersection point is inside the real cylinder, a new line $l_3$ starting at the intersection point X is extended parallel to the bend line. If this new line $l_3$ intersects the projected lines $l_1$, $l_2$ an odd number of times, it is decided that the intersection point X is inside the real cylinder. However, if the new line $l_3$ intersects an even number of times with the projected lines $l_1$, $l_2$, it is decided that the intersection point X is outside the real cylinder.

Figure 13:
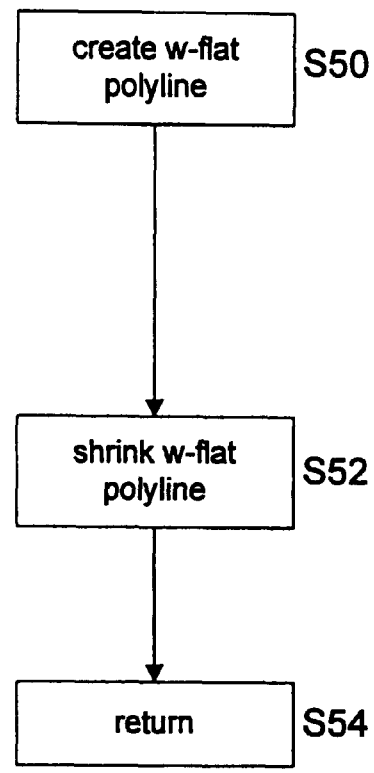
FIG. 13 is a flow diagram showing a preferred process for transforming a 3-D polyline into a cut loop according to the present invention.

With reference to FIG. 13, the calculation of the 2-D polyline is explained. First at step S50, each point on the 3-D polyline (generated above) is unfolded to be flat (i.e., into a plane) and creates a w-flat polyline. The arc length of the 3-D polyline is the same as the length of the w-flat polyline, i.e., the shrinking of the flat is not yet performed. Then at step S52, the shrinking previously described is performed to determine the 2-D polyline. The shrinking amount is derived from the bend deduction as described above. Then, at step S54 the control returns to the calling function.

Figure 10A:
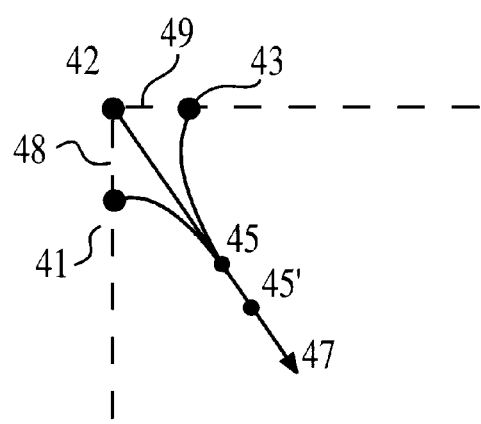
FIG. 10a is an enlarged view of a corner shown in FIG. 10 and illustrates a cut loop calculated in accordance with a preferred embodiment of the present invention.

From the 2-D polyline, a loop (relief hole) can be created, to indicate the area that must be cut from the flat in order to create the smooth, two radius corner when the flat is folded. The loop is defined by four sides and four end points as shown in FIG. 10*a*. Two end points 41, 43 are the non-intersecting ends of the 2-D polylines. A third point 42 is determined by extending the end points 41, 43 of each 2-D polyline parallel to each bend line 12, 14 to obtain extended lines 48, 49. The intersection of the extended lines 48, 49 is then set equal to the third point 42 and the extended lines 48, 49 defined by end points (41, 42) and (43, 42) are set equal to the first two sides of the loop. The fourth point 45 is the intersection of the 2-D polylines. The second two sides of the loop are the 2-D polylines themselves 40, 40'.

In a preferred embodiment, the fourth point (and consequently, the second two sides 40,40') are adjusted to compensate for potential numerical error involved in the calculations. The adjustment provides a slightly larger loop than the loop just described because if the loop is too small, (a possible result of numerical error), interference still occurs. Thus, to avoid the numerical tolerance problem, the intersection point 45 of the polylines is shifted to new point 45'. In a preferred embodiment, the shift is by 1%–2% of the bending radius in the direction shown as arrow 47 in FIG. 10*a*. The direction of arrow 47 is along an approximated line of symmetry of the 2-D polylines, in the direction away from the 3rd intersection point 42 and towards the fourth intersection point 45. A punch the size of the larger loop (relief hole) is then used to punch the relief hole to enable construction of the user specified part having a finished two radius corner.

Figure 7:
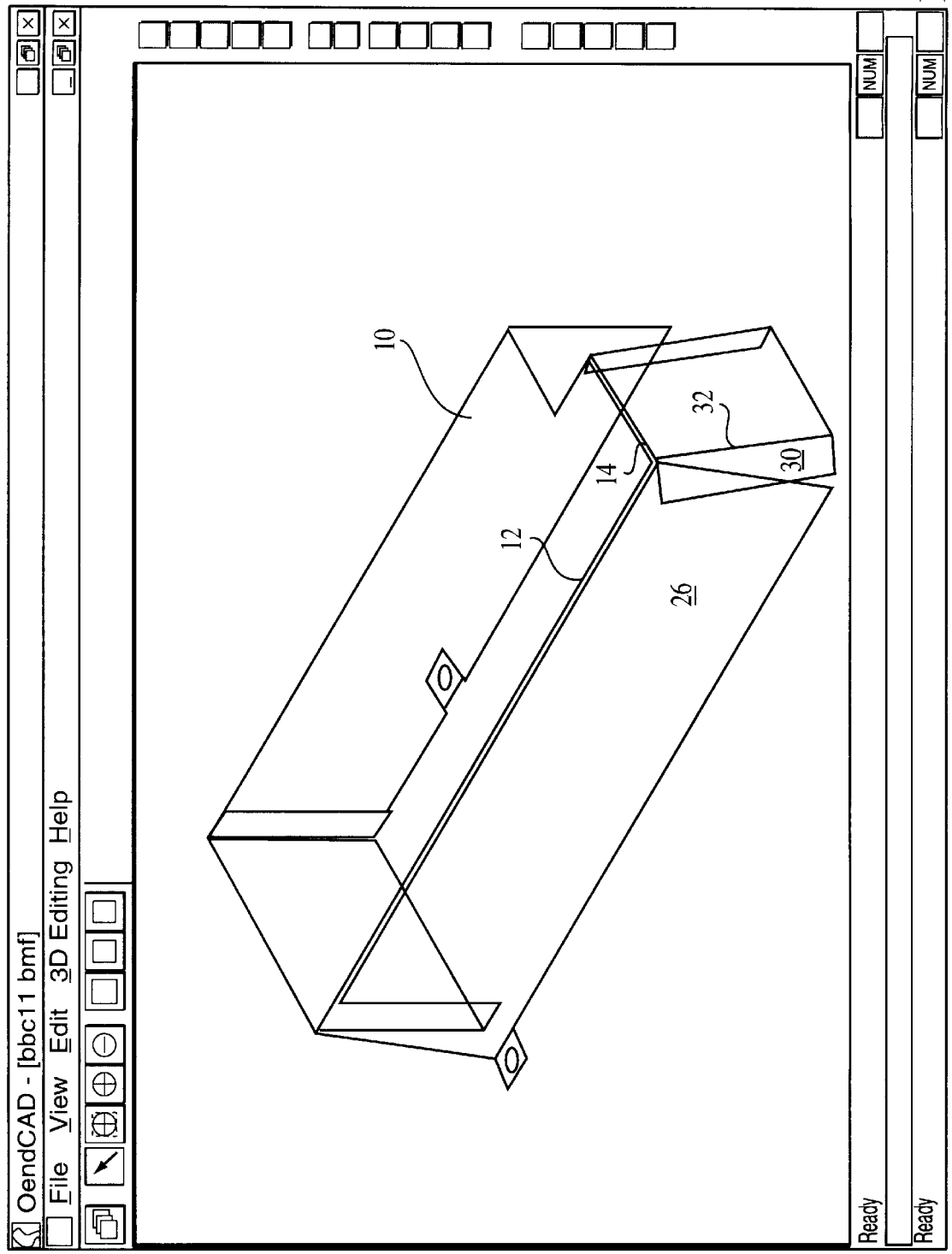
FIG. 7 is an illustration of a part model showing a set back/3-D trim type collision between faces in accordance with a prior art design.
Figure 8:
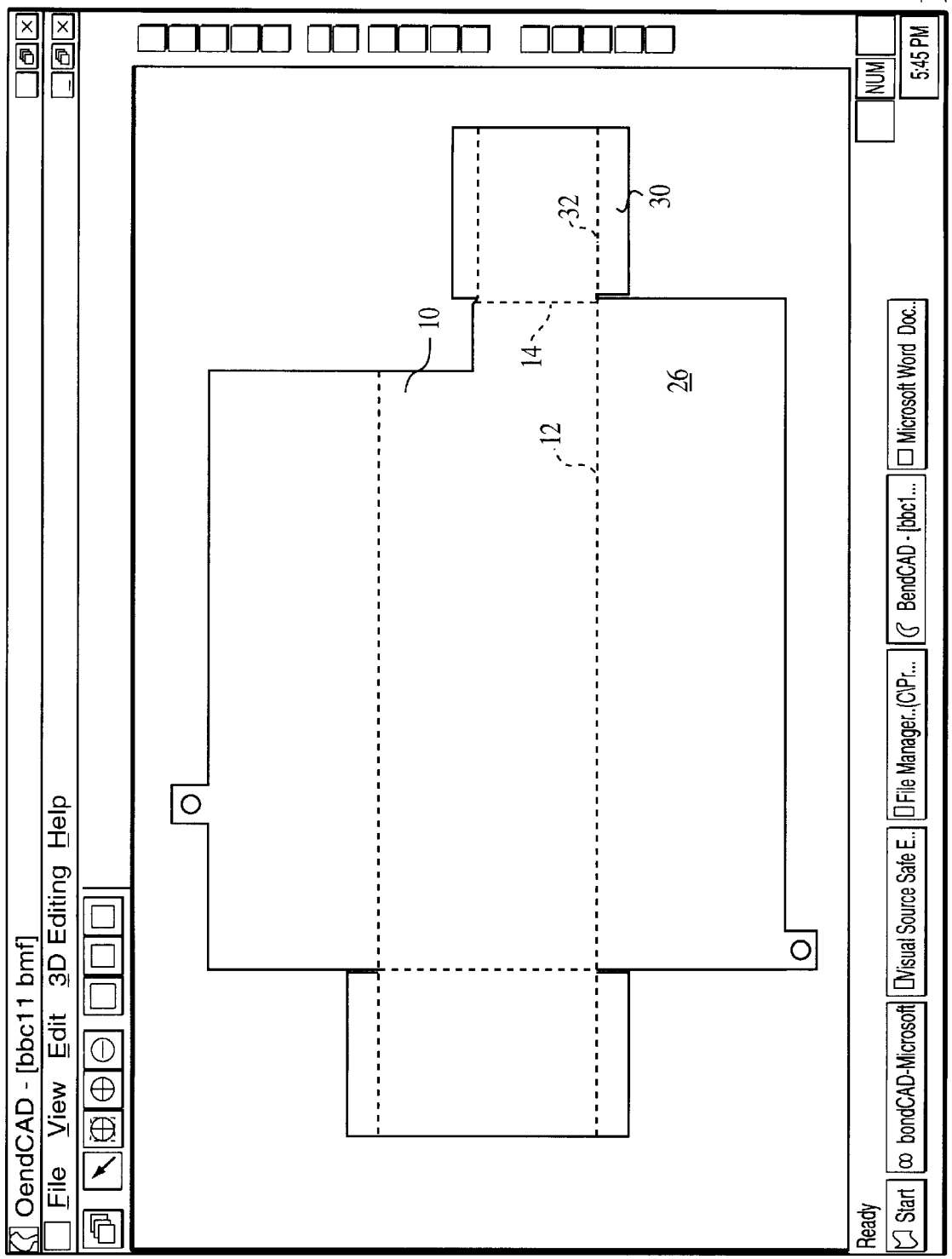
FIG. 8 is an illustration of a flat sheet metal part, for bending into the part shown in FIG. 7, designed using a system of the prior art.

The resolution of other types of collisions is now described. In order to eliminate a collision between two faces, either one or both of the colliding faces have to be trimmed. The trimming is done by, first computing a trim-loop for the face, and then trimming the face by the trim-loop. The trim-loop is computed based on: a collision type (e.g. setback (shown in FIG. 7), 3-D trim (shown in FIG. 7) or face overlap (shown in FIG. 3)); user defined parameters describing the desired face to face contact; and a collision area.

According to a preferred embodiment of the present invention, a collision detection algorithm may be employed to check for a collision between two faces. The algorithm has three purposes: checking whether or not two faces collide; computing the collision area for each face; and checking the collision type. In order to check if the two faces collide, the collision area for each face must be computed. If the collision area (which is a loop) is empty, there is no collision. The collision area for a face is represented as a loop on the surface of the face such that any point common to both faces (i.e. collision point) falls within that loop.

In order to classify the type of collision, a number of parameters must be computed. Once the collision type is positively identified, these parameters will be stored so that later when an appropriate routine is called to eliminate the collision, the same parameters can be used without having to be recomputed. The output of the algorithm classifying the collision type is one of the following four types: face overlap; setback; 3-D trim; or none of the above.

Figure 14:
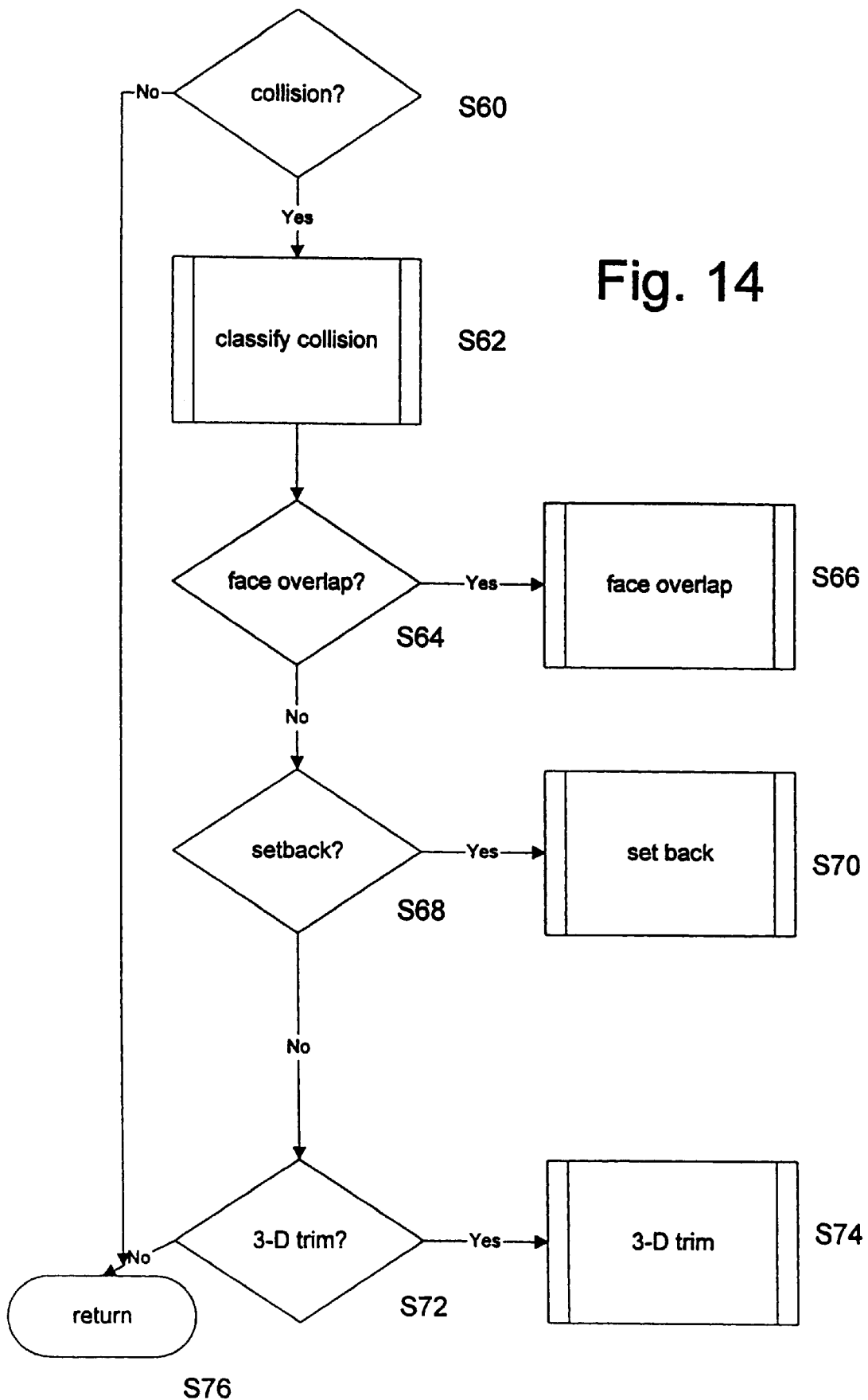
FIG. 14 is a flow diagram showing a preferred process for classifying and eliminating a collision according to the present invention.

Referring now to FIG. 14, a preferred collision analysis according to the present invention is explained. At step S60, a three-dimensional folded part model is analyzed to determine if any collisions occur between faces. Any known collision detection method may be used for this analysis, such as ACIS commercially available from Spatial Technology. If no collisions are found, at step S76 the logic returns control to the calling routine. If, however, a collision is found, at step S62 the collision is classified. If the two colliding faces are parallel to one another, the collision is classified at step S64 as face overlap. At step S66, a function for resolving the face overlap collision begins and is described below with reference to FIG. 15. If a collision occurs, and the two faces are not parallel, it is determined whether the collision is a setback collision or a 3-D trim collision. At step S68, it is determined whether the collision is of the setback variety. If the collision is determined to be a setback, the logic proceeds to step S70 where a function is invoked to resolve the setback collision. If the collision is not a setback, at step S72 the collision is analyzed to determine if it is a 3-D trim. If the collision is a 3-D trim, the logic flows to S74 where a function is invoked to resolve the collision. If a collision cannot be classified as a face overlap, setback or 3-D trim, the collision type will be undefined and the control returns to the calling routine at step S76. Note that in case the collision satisfies both setback and 3-D trim conditions, the collision will be classified as a setback because it is the preferred classification.

Figure 18:
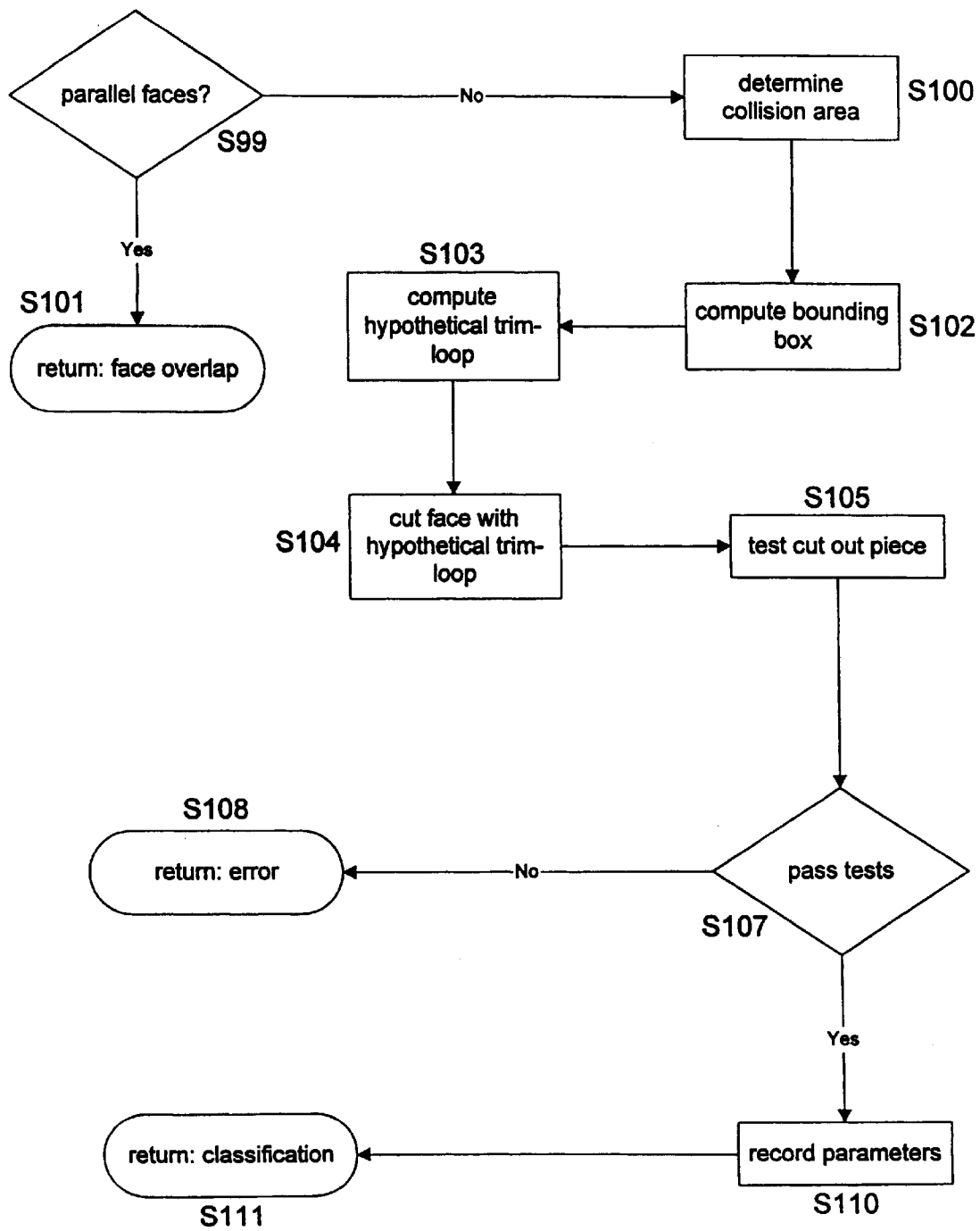
FIG. 18 is a flow diagram showing a preferred process for classifying a collision according to the present invention.
Figure 19A:
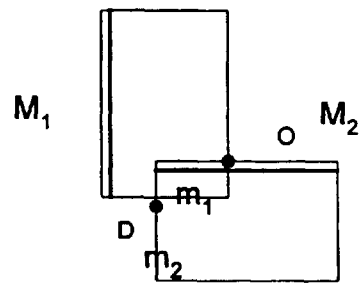
FIGS. 19a–19j show a table illustrating possible face overlap configurations and the corresponding origin and diagonal points according to the present invention.
Figure 19B:
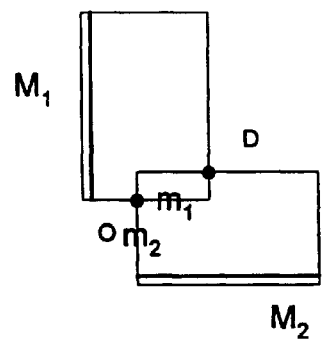
Figure 19C:
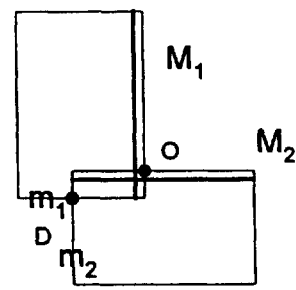
Figure 19D:
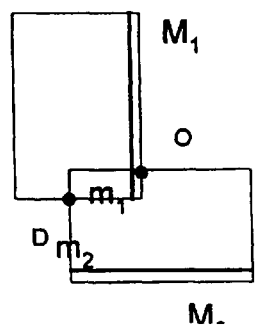
Figure 19E:
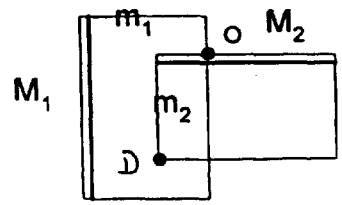
Figure 19F:
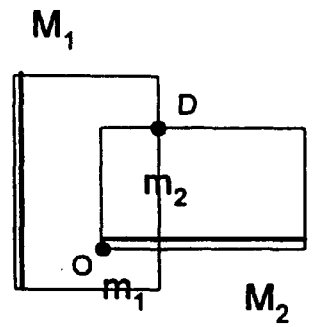
Figure 19G:
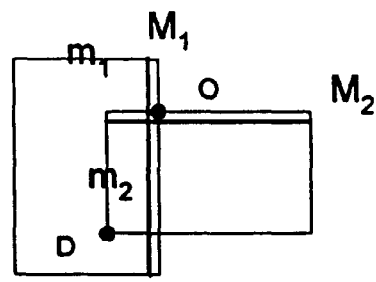
Figure 19H:
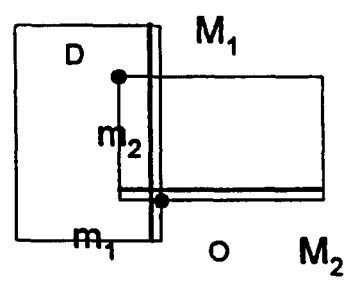
Figure 19I:
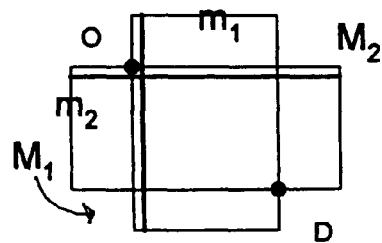
Figure 19J:
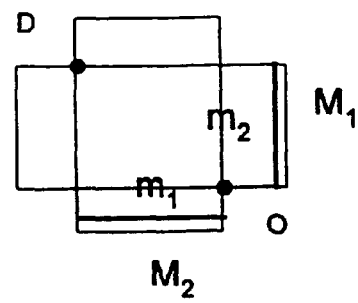

Referring now to FIG. 18, an exemplary process is described for classifying the collision type. At step S99 it is determined whether the colliding faces are parallel. If the faces are parallel, the collision is classified as a face overlap and the logic returns at step S101. If the faces are not parallel, the collision area must be determined at step S100, and a collision area bounding box must be computed at step S102. The collision area bounding box is a rectangle having two of its sides parallel to a collision intersection line (the two other sides must then be perpendicular to the first two sides) and containing the collision area within the rectangle. The collision intersection line is the intersection line of the underlying planes of the two colliding faces. The collision area bounding box is computed by finding the extreme points of the collision area with respect to four vectors. Two of the vectors have opposite directions and are parallel to the collision intersection line. The other two vectors also have opposite directions but are perpendicular to the collision intersection line.

Subsequently, a primary side of the collision area bounding box is defined for the particular collision area bounding box. The primary side of the collision area bounding box is the side of the bounding box that is parallel to the collision intersection line. Note that the collision area bounding box has two primary sides. A primary side width vector must also be defined with respect to a primary side of the collision area. When a primary side of the collision bounding box is given, a primary side width vector can be defined as being perpendicular to that primary side and pointing towards the other primary side of the collision area bounding box.

When checking the collision type, at step S103 (FIG. 18), the algorithm constructs (i.e., computes) a hypothetical trim-loop 200 (FIG. 14a), trims the face 210 by the hypothetical trim-loop 200 at step S104, and tests if the piece of the face that was cut out satisfies certain conditions at step 105. In general, the hypothetical trim-loop 200 always includes a region that covers the collision area 220 plus the area of the face either to the left or right of the collision area 220 as viewed from FIG. 14a. Points $p_1$–$p_4$ of FIG. 14a define the hypothetical trim loop. At first it might appear that it is sufficient to cut out only the collision area (which would leave a hole in the face) to eliminate the collision. However, the part would not be manufacturable with smooth faces because, while no collision occurs in the final bent version of the part, collisions would occur in the process of bending the part. Therefore, in addition to the collision area, either the left or the right side of the collision area also has to be trimmed.

In order to check the collision type for setback or 3-D trim, both faces will be independently tested according to the following conditions at step S105. If both faces pass the appropriate tests (either setback or 3-D trim), the collision will be classified accordingly. If the one of the faces does not pass one of the tests, the logic returns to the calling routine at step S108 and no trimming will occur.

First, two hypothetical trim-loops must be constructed, one for the left region 200 and the other for the right region at step S103. Second, for each hypothetical trim-loop 200, a piece of material is cut out of the face 210 by computing a boolean function "face ∩ trim-loop" that computes the intersection of the face 210 and the hypothetical trim-loop 200 at step S104. In other words, the cutout piece is the area covered by both the face 210 and the hypothetical trim-loop 200. Third, the left-side cutout piece and then the right-side cutout piece are tested for certain properties (described below) at step S105. Finally, if a cutout piece satisfies the required properties at step S107, then this face passes the collision type test. However, both faces must pass the same test. The parameters used to compute the hypothetical trim-loop 200 will then be saved for later use at step S110.

When computing the hypothetical trim-loop 200 (step S103), a guess is made as to whether the collision is setback or 3-D trim. Then, the corresponding hypothetical trim loop is calculated. For 3-D trim, the hypothetical trim-loop 200 is constructed the same way as for setback (described below), with just one difference. In 3-D trim, when a primary side of the collision area is selected, corners $p_1$ and $p_2$ will be computed by extending the primary side in both directions such that points $p_1$ and $p_2$ will be outside of the face. On the other hand, for setback, the points $p_1$ and $p_2$ will be the endpoints of the selected primary side.

For setback, the hypothetical trim-loop construction will now be described. The following description assumes that the hypothetical trim-loop 200 is being constructed for the left side of the collision area 220 shown in FIG. 14a, although the algorithm is identical if the hypothetical trim-loop 200 is constructed for the right side, except that left and right are reversed in the directions for each step.

The hypothetical trim-loop 200 is a rectangle defined by four corners $p_1, p_2, p_3$ and $p_4$. Consequently, the sides of the rectangle are lines $(p_1, p_2)$, $(p_2, p_3)$, $(p_3, p_4)$ and $(p_4, p_1)$.

First, the rightmost primary side of the collision area bounding box is selected. The rightmost side is utilized because the hypothetical trim-loop 200 has to cover the collision area 220 as well as the area of the face to the left of the collision area (because the hypothetical trim-loop 200 is constructed for the left side). The end-points of the selected primary side will be corners $p_1$ and $p_2$.

Next, a vector v is calculated. The vector v has the same direction as the primary side width vector defined for the selected primary side. The length of the vector v will be set equal to a value d such that d is larger than the largest dimension of the face, i.e., the length or width. The utilization of value d that is larger than the largest face dimension guarantees that the width of the trim-loop is large enough to ensure that all of the area to the left of the bounding box is also removed from the face. Finally, corners $p_3=p_2+v$ and $p_4=p_1+v$ are computed, and the corners are connected to create the hypothetical trim-loop 200.

Once a hypothetical trim-loop is created, it will be used to cut a piece of metal out of the face (step S104). This cutout piece is then tested for certain properties (step S105). In order to determine whether the cut out piece has passed the tests at step S107, the cutout piece has to satisfy the following properties:

1) The cutout piece may not contain any edge adjacent to a bend line, such that the remaining face contains no edge adjacent to the same bend line. Satisfying property 1 ensures that when trimming, no bend line is completely cut out.

2) No edge in the cutout piece may be part of a hole in the original face. Satisfying property 2 ensures that when trimming, no hole is cut. Every edge of the cut out piece is checked to see if it came from a hole in an original version of the piece.

When checking for setback at step S107, the cutout piece has to satisfy the first two properties as well as an additional condition:

3) The width of the cutout piece in the direction of the primary side width vectors may not be greater than some constant c times the metal thickness. In general, when the face is cut with the hypothetical trim-loop, the resulting cutout piece does not necessarily have to be just one piece. Instead it may contain a number of disconnected pieces of material. If this were to happen, then pieces that do not contain any edge adjacent to the collision area are discarded. Remaining pieces are then tested for satisfaction of the properties. In a preferred embodiment, the value of c is 2–3.

If the cut out piece satisfies the tests at step S107, the collision is classified, certain parameters are saved at step S110, and control returns to the calling function at step S111. If the cut out piece does not pass the tests at step S107, the attempt to classify the collision as the type selected when constructing the hypothetical trim-loop fails and control returns to the calling function at step S108. At this point, another hypothetical trim-loop (for the collision type not previously checked) may be constructed at step S103 and the process can repeat.

Once a collision type is positively identified, three parameters used in checking the collision type are saved for use when the actual trimming is done. First, two extreme points of the cutout piece (or pieces if more than one) along the line that covers the primary side (cover-line) are computed, mapped onto that cover-line and saved for future use. Later these points will be referred to as points $p_1$ and $p_2$. Also, vector w is saved (step S110). The vector w has the same direction as the primary side width vector of the primary side which passed the test. The length of w is the width of the cutout piece with respect to the primary side width vector.

Once the collision is classified as either a setback or a 3-D trim, the excess from either face or both faces needs to be trimmed in order for there to be a smooth transition between faces after bending. In addition, excess can be trimmed in order to leave a gap between the outside surfaces of the faces after bending, resulting in an open corner. Moreover, if the cut is near a bend line, the cut should be moved so that it is parallel to the bend line so a more finished looking part is produced. Thus, to resolve the collision, for each face, the hypothetical trim-loop may need to be adjusted before trimming the face. Th adjustment is done based on parameters $p_1, p_2$ and w computed during the collision type check, and user defined parameters.

The user defined parameters describe the desired face to face contact. Possible face to face contact types are open corner shown in FIG. 14*b* and closed corner shown in FIG. 14*c*. Open corner means that both faces are touching at the inside plane (i.e., the plane of the other face that is closer to the first face) of the other face. Closed corner means that one face is touching the inside plane of the other face and the other face is touching the outside plane of the first face. In a preferred embodiment, when creating a closed corner, the user must enter an offset value. The offset value is used to specify the amount the face edge should be offset from the open or closed location.

As stated above, in order to trim the face, a trim-loop has to be computed. The trim-loop is a loop containing four lines (not necessarily a rectangle) computed according to an algorithm now described.

In order to construct a trim-loop, four corners $p_1, p_2, p_3$ and $p_4$, have to be specified. Once $p_1, p_2, p_3$ and $p_4$ are known, the trim-loop can be built from lines $(p_1, p_2)$, $(p_2, p_3)$, $(p_3, p_4)$ and $(p_4, p_1)$. Initially corners $p_1$ and $p_2$ of the trim-loop are set equal to points $p_1$ and $p_2$ computed and stored by the collision type detection algorithm at step S110. Then, the user defined parameters are checked to determine the type of corner desired. If the user selected a closed corner, a little bit less trim is required to create the desired corner. Accordingly, $p_1$ and $p_2$ are shifted in the direction of w. The shift amount is equal to the thickness of the other face. If an open corner is selected, the original $p_1$ and $p_2$ are used. Once $p_1$ and $p_2$ of the trim-loop are known, corners $p_3$ and $p_4$ can be computed as, $p_3=p_2+w$ and $p_4=p_1+w$. Note that lines $(p_1, p_2)$ and $(p_3, p_4)$ are parallel to the collision intersection line.

Next, it is determined if any of the corners $p_1$ or $p_2$ is very close to a bend line that is adjacent to the face. A point, $p_i$, is considered to be close to the bend line if its distance from the bend line is no more than $(b+\epsilon)$ where $\epsilon$ is a distance tolerance (usually within $10^{-4}$–$10^{-6}$ part units (typically mm or inches)), and b is half of a bend line area width. The bend line area is the area of the metal transformed by bending during the bending process. The bend line area width is the dimension of the bend line area in the direction perpendicular to the bend line itself.

If it happens that $p_i$ is close to the bend line as defined above, $p_i$ is extended to the bend line, parallel to the collision intersection line. If either $p_1$ or $p_2$ was determined to be close to the bend line and was extended to the bend line, the line $(p_2, p_3)$ (or $(p_4, p_1)$ respectively) must be transposed so that it is parallel to the bend line. The transposition occurs by extending $p_3$ (or $p_4$, respectively) to the same bend line, parallel to the collision intersection line.

Figure 20:
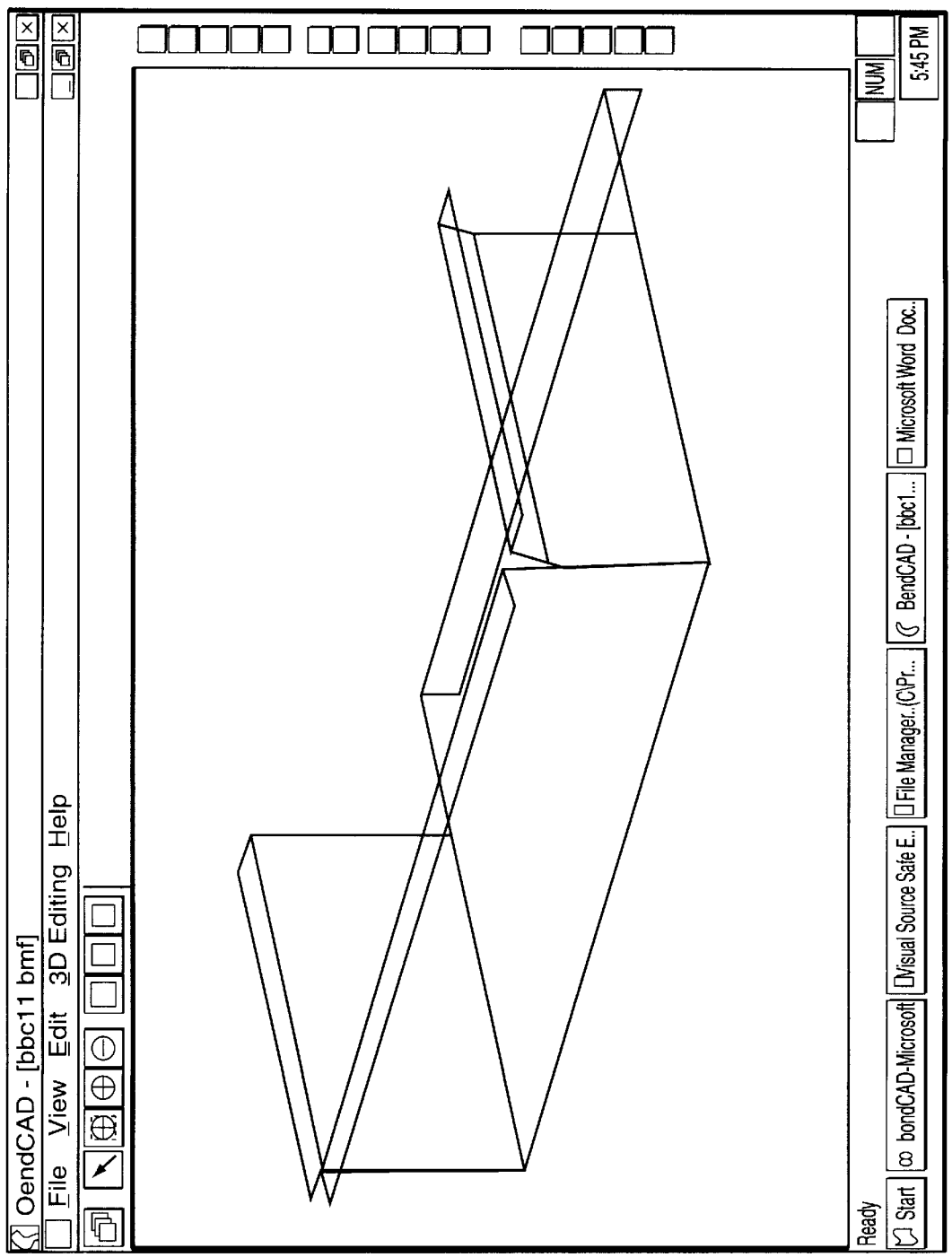
FIG. 20 is an illustration of a part model showing the setback/3-D trim problem resolved in accordance with the present invention.
Figure 21:
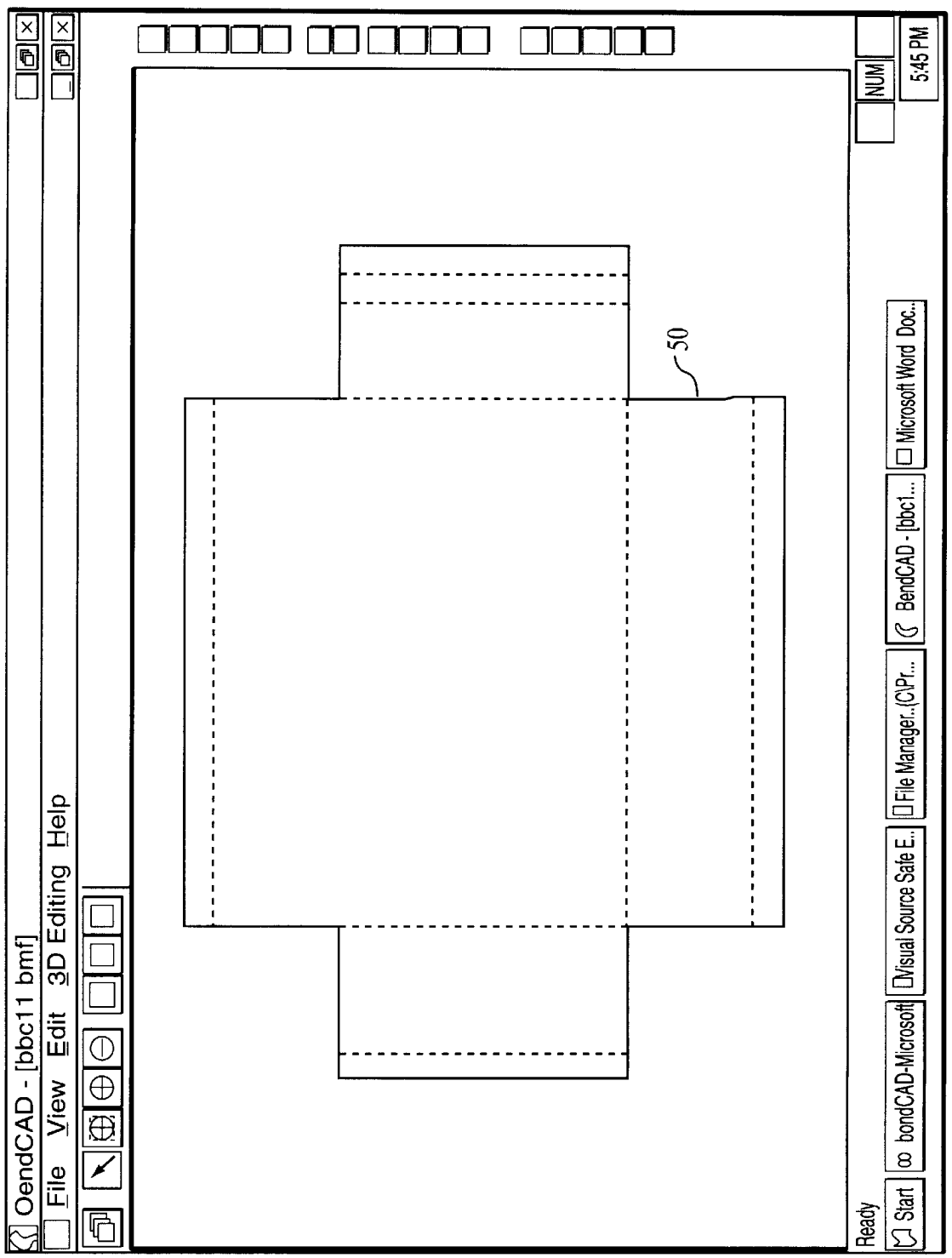
FIG. 21 is an illustration of a flat sheet metal part, for bending into the part shown in FIG. 20, designed using a system of the present invention.

As a result of this process, a flat sheet metal part may be re-designed as illustrated in FIG. 21. Note the cut line 50 resulting from the process of the present invention. As a result of the cut line shown in FIG. 21, the finished 3-D part shown in FIG. 20 can be constructed with a smooth, finished corner.

Figure 1:
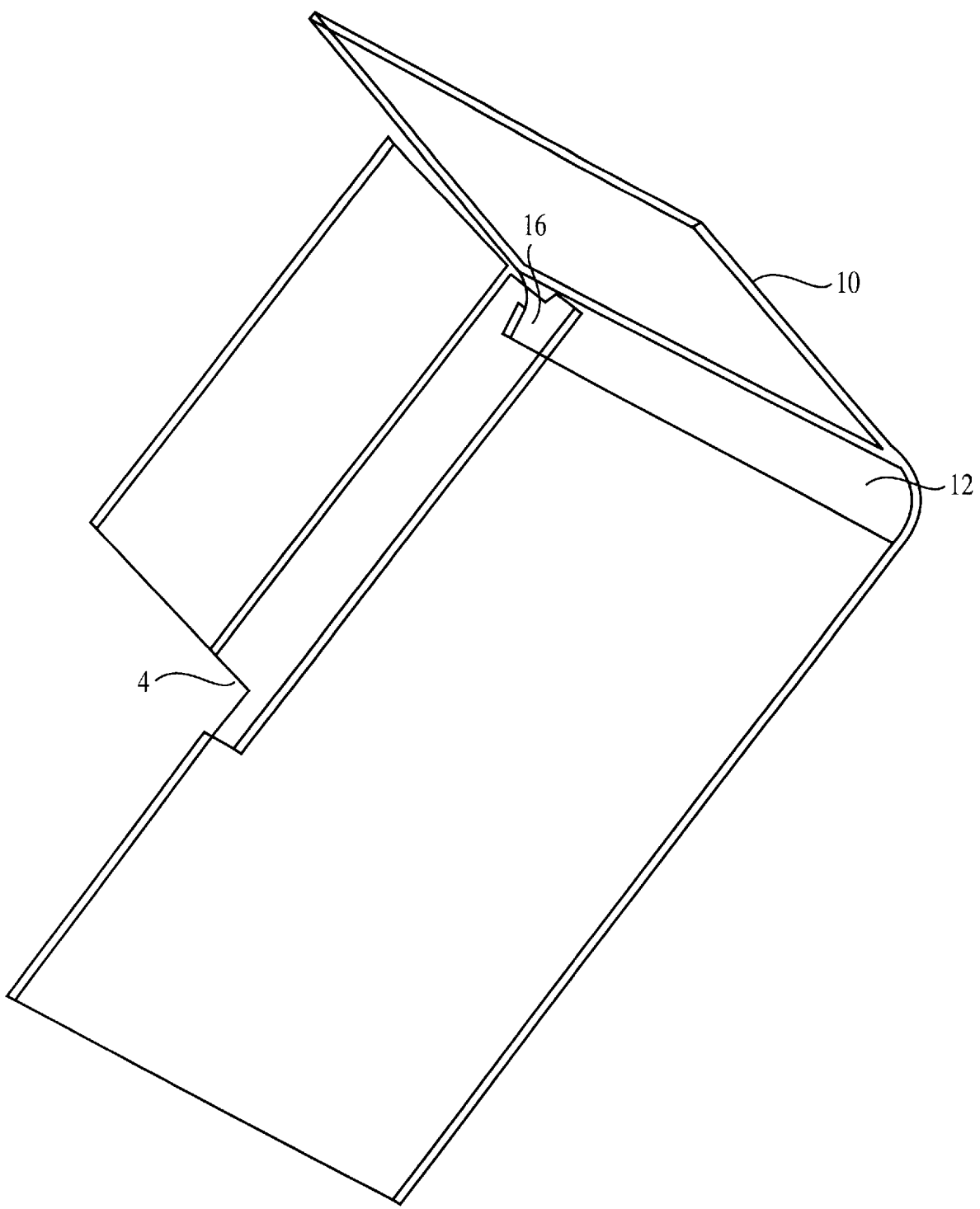
FIG. 1 is an illustration of a part model showing a warping problem at the intersection of faces in accordance with a prior art design.
Figure 2:
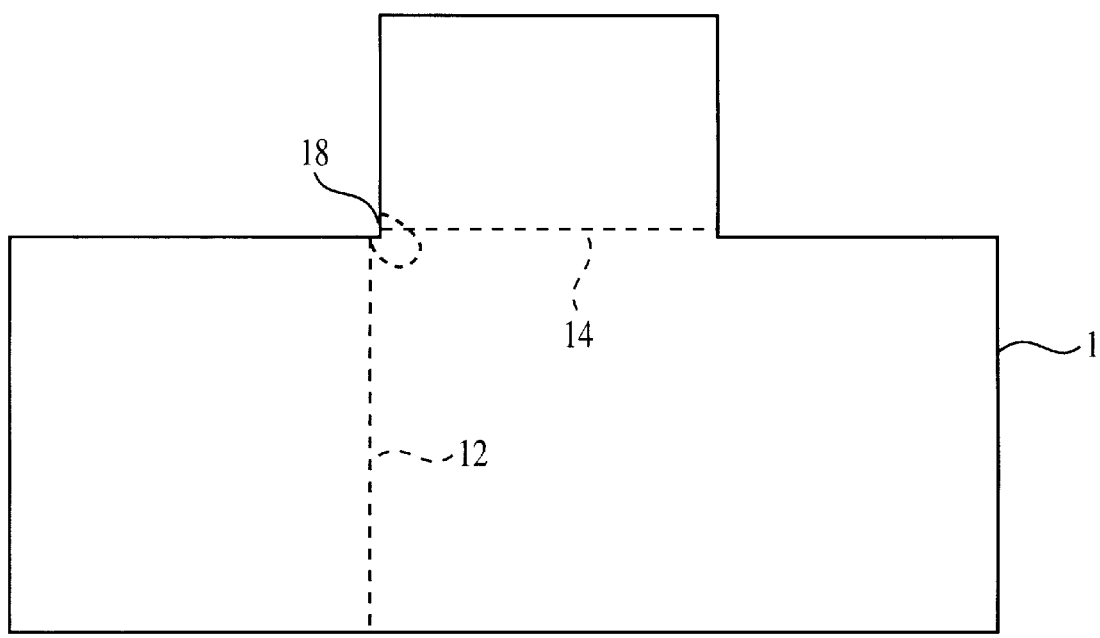
FIG. 2 is an illustration of a flat sheet metal part, for bending into the part shown in FIG. 1, designed using a system of the prior art.
Figure 3:
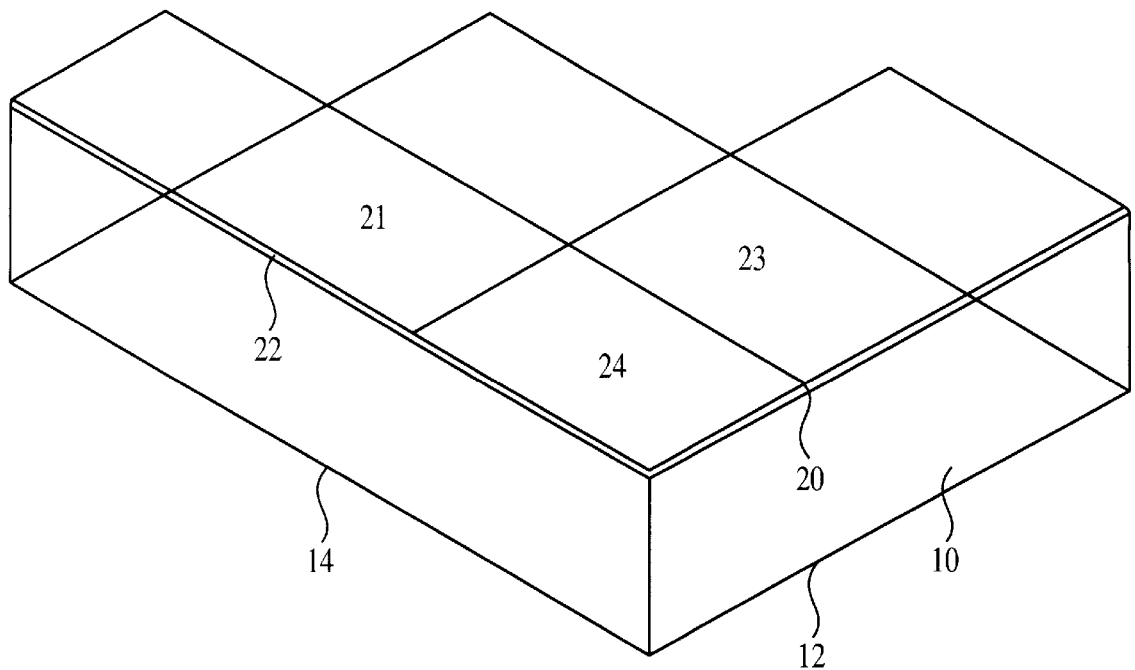
FIG. 3 is an illustration of a part model showing a face overlap problem at the intersection of faces in accordance with a prior art design.
Figure 4:
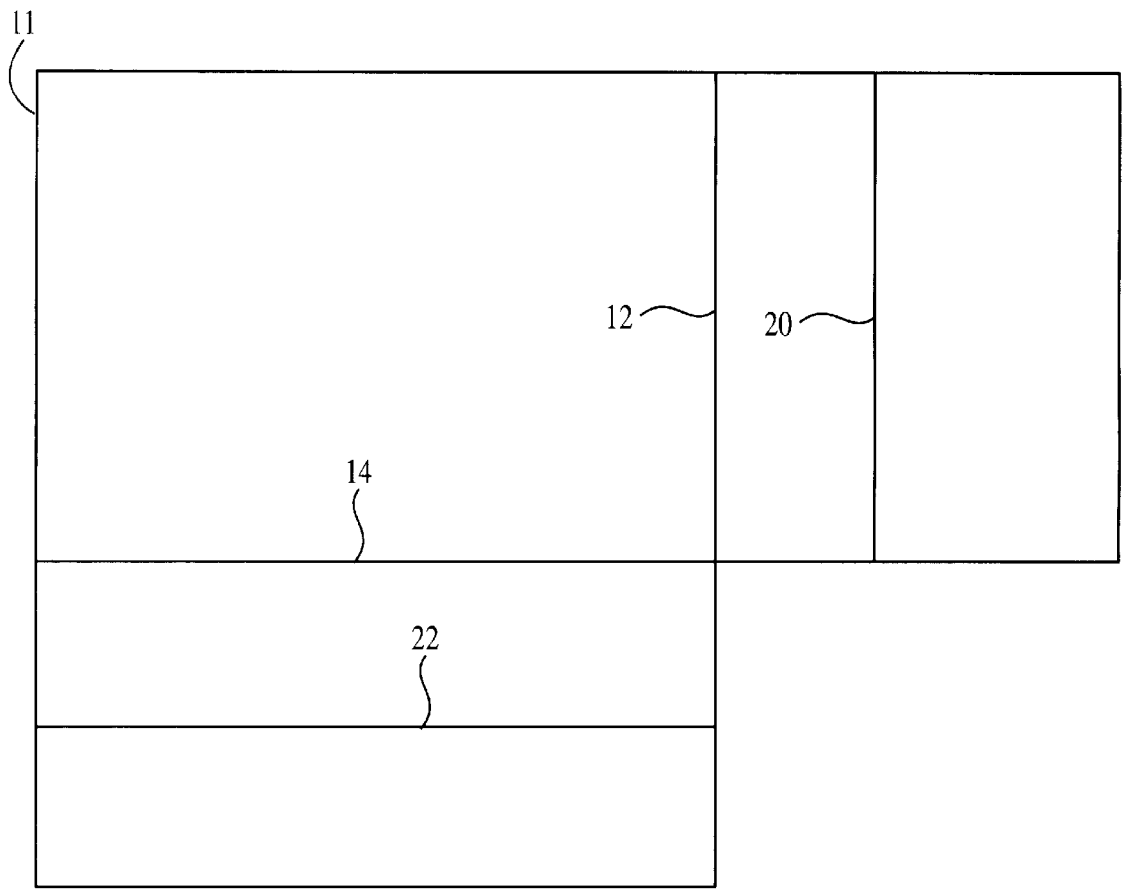
FIG. 4 is an illustration of a flat sheet metal part, for bending into the part shown in FIG. 3, designed using a system of the prior art.
Figure 15:
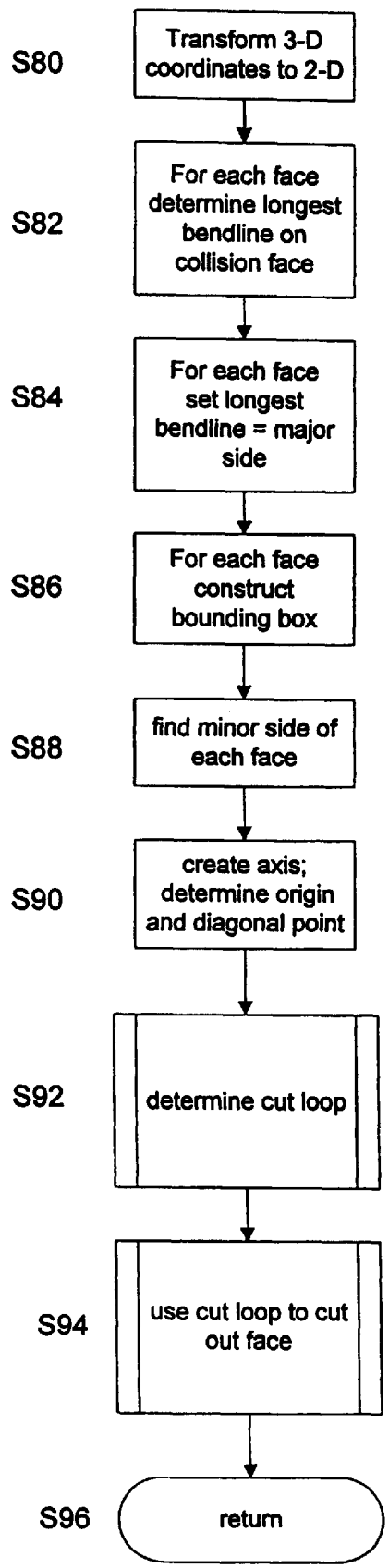
FIG. 15 is a flow diagram showing a preferred process for resolving a face overlap collision.

With reference to FIG. 15, an exemplary process for resolving a face overlap collision, shown in FIG. 3, is now described. First, at step S80, the colliding faces are transformed from their 3-D part coordinates into 2-D screen coordinates. Then at step S82, for each face the longest bend line on the colliding face is found. At step S84, the longest bend line is set equal to the major side for each face.

Subsequently, at step S86 for each face a bounding box is constructed. A bounding box length is obtained by extending the major side parallel to the bend line such that a rectangle having that length will encompass the complete width of the other face. The bounding box's width is obtained by translating the major side perpendicular to the bend line such that a rectangle having that width would circumscribe all overlapping points of the other face plus any points extending past the overlap in the other face's length direction. After the length and width are determined, the box is drawn. Thus, the bounding box for a face is simply the smallest rectangle which completely encompasses that face and the unwanted overlapping region of the other face involved in the collision. One advantage of using a bounding box, is that if the face has an irregular shape, the bounding box provides an approximation facilitating easier calculation.

After the bounding box is constructed, at step S88 the minor side of each face is found. The minor side is determined by looking at the three sides of the face other than the major side and selecting the minor side to be the side closest to the major side of the other face. Then, at step S90 an axis is created and an origin and diagonal points are located. The diagonal point represents a point diagonal to the origin point. The axis is created by extending both major sides parallel to the corresponding bend lines. The origin is the intersection of the extended major sides.

According to a preferred embodiment of the present invention, the origin and diagonal can be determined by pattern matching. The set of all possible overlap configurations is shown in FIGS. 19a–19j. The reference characters $M_1$ and $M_2$ respectively denote the major sides of a primary face and a secondary face. The $m_1$ and $m_2$ reference characters respectively denote the minor sides of the primary face and secondary face. Thus, after determining the overlap configuration of the overlapping faces being analyzed, and matching the configuration to the corresponding configuration shown in the table in FIGS. 19a–19j, the origin is set equal to the intersection designated as O, and the diagonal point is set equal to the point labeled D.

Next, the cut type is selected. Exemplary cut types are diagonal, and 45°. A diagonal cut extends from the origin to the diagonal point. A 45° cut extends from the origin at a 45° angle relative to the major side of the primary face.

Then at step S92, the cut loop is determined. If a diagonal cut is selected, the bounding box of each face is trimmed with the diagonal line creating the diagonal cut loops. If the 45° cut is selected, both bounding boxes are trimmed with a 45° line creating the 45° cut.

At step S94, the cut loop is used to cut out the faces. First in order to trim the primary face, the cut loop of the secondary face is used to cut out the primary face. Next, the primary cut loop is used to trim the secondary face. Finally, at step S96, the logic returns control to the calling routine. Thus, each face has a cut loop and the intersection between one face and the other colliding face's cut loop is what is removed. Of course, any standard algorithm for computing the intersection between faces may be used and accordingly no such algorithm is described herein. The process of step S94 is utilized so that the entire overlap is not removed from one of the faces, but a portion is removed from each. In particular, as shown in FIG. 16, an approximately triangular portion is cut out of each face to achieve the smoothly meeting faces.

Figure 16:
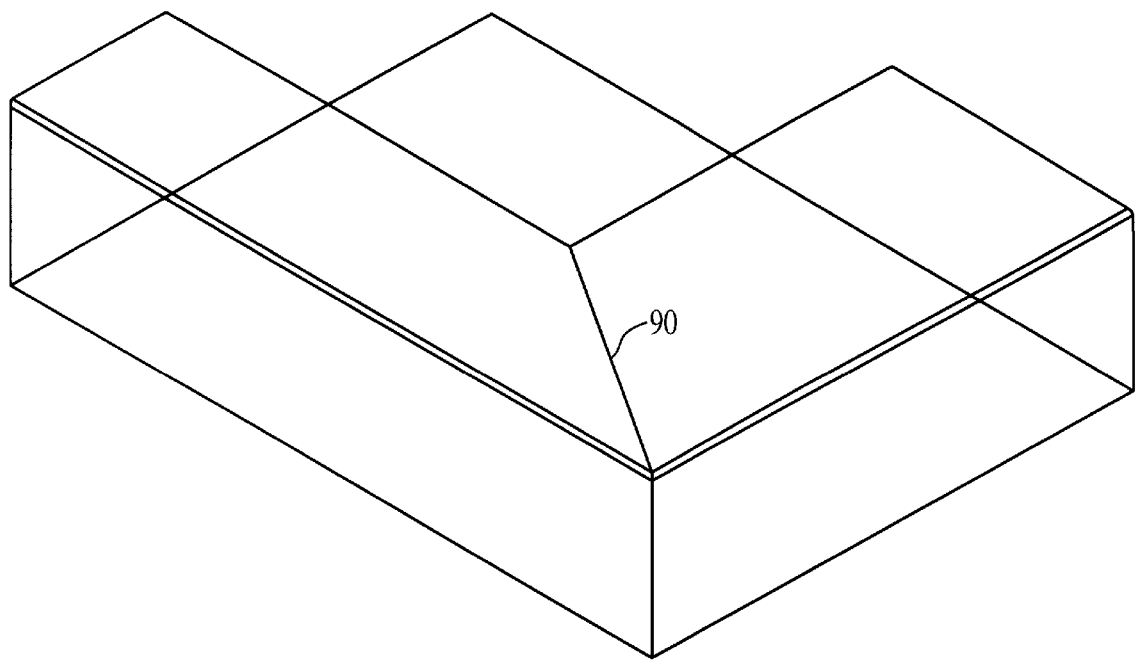
FIG. 16 is an illustration showing a part having the face overlap problem resolved according to a preferred embodiment of the present invention.
Figure 17:
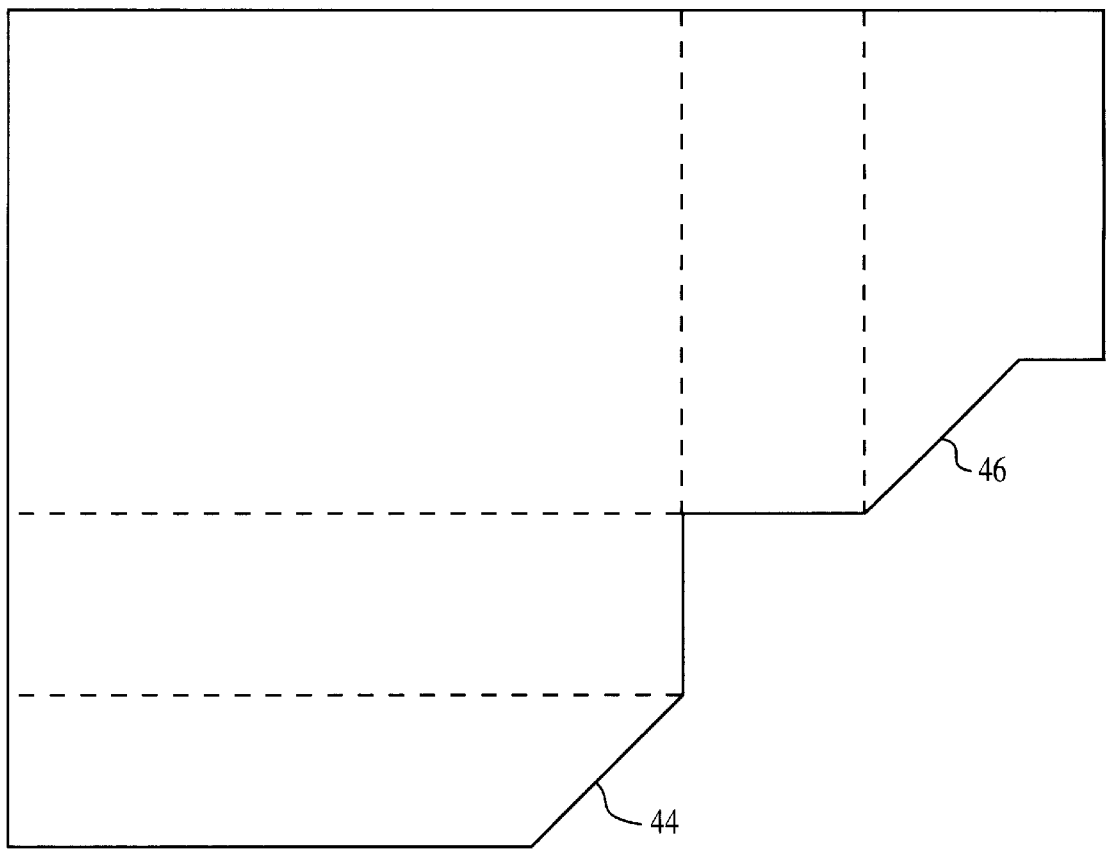
FIG. 17 is an illustration of a flat sheet metal part, for bending into the part shown in FIG. 16, designed using a system of the present invention.

An example of a part using a 45° cut line is illustrated in FIG. 16 where the collision between the faces 24 (FIG. 3) is removed and a more finished looking diagonal cut line 42 is left in place of the colliding faces. FIG. 17 illustrates a corresponding re-designed flat unfolded sheet metal part having the proper cuts to achieve the finished three-dimensional sheet metal part shown in FIG. 16. Note the cuts 44, 46 of the flat sheet metal part allow the flat sheet metal part to be bent into the finished sheet metal part shown in FIG. 16.

In a preferred embodiment, the process will automatically repeat for all sets of colliding faces in a part. Thus, a user may simply select the desired cut and the computer program of the present invention will determine the appropriate cuts for all sets of colliding faces in order to achieve a finished part. In other words, if there are two sets of faces which overlap in a part, the cut for both sets of faces will be determined automatically rather then having the user select the type of cut for each face overlap.

Figure 5:
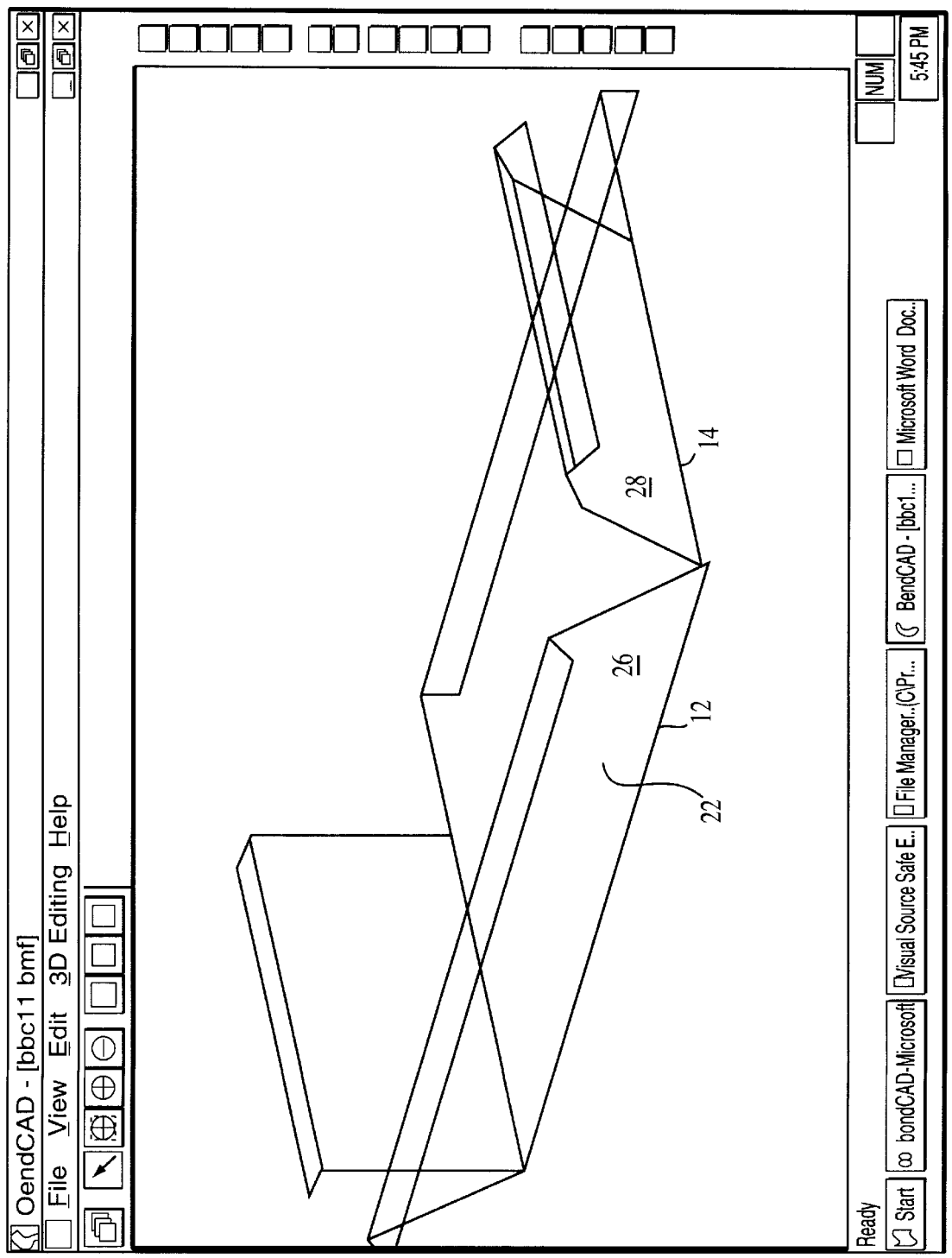
FIG. 5 is an illustration of a part model showing a face extend problem in accordance with a prior art design.
Figure 6:
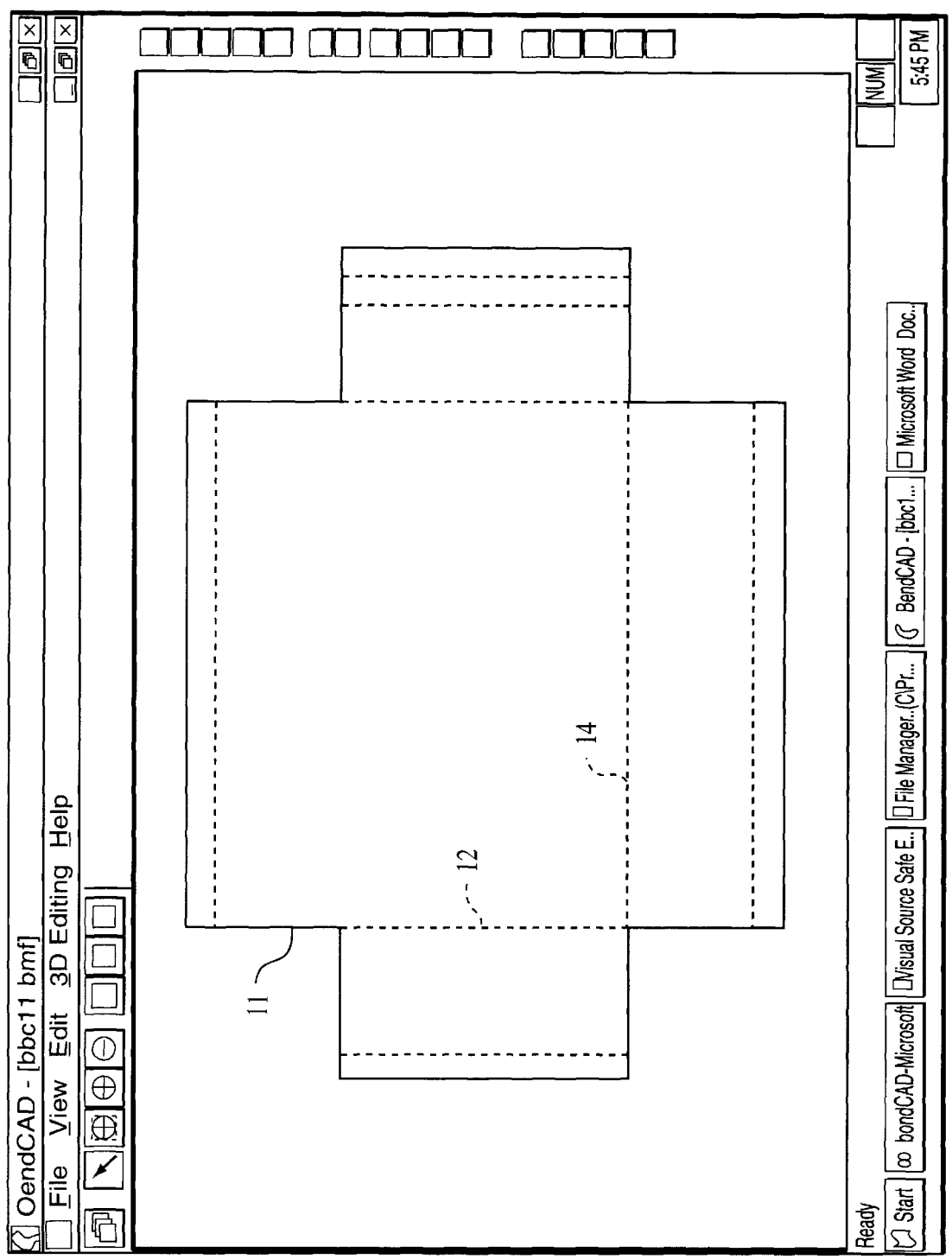
FIG. 6 is an illustration of a flat sheet metal part, for bending into the part shown in FIG. 5, designed using a system of the prior art.
Figure 23:
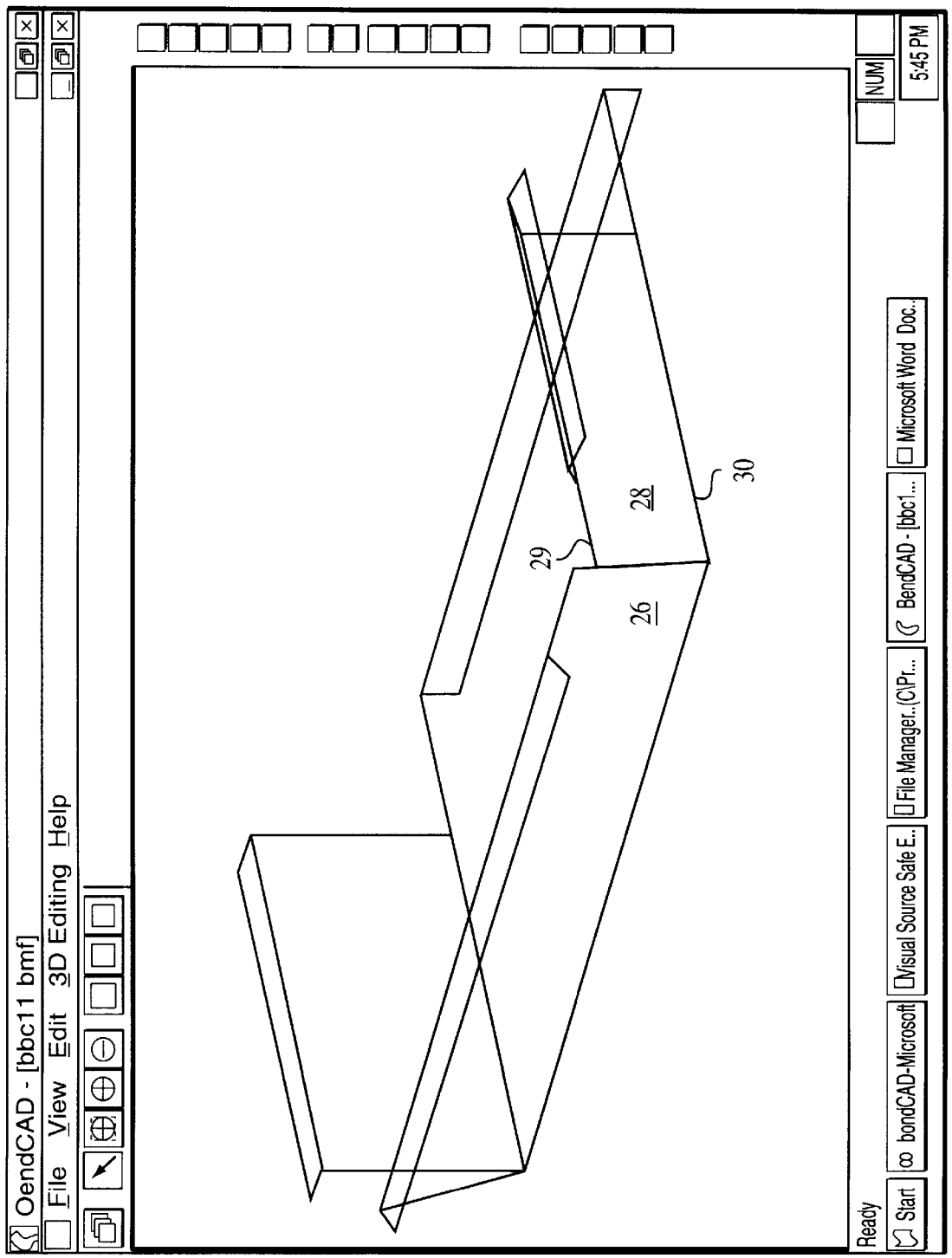
FIG. 23 is an illustration of a part model showing the face extend problem resolved in accordance with the present invention.

In situations where a part is designed such that two non-parallel faces in a folded part are not colliding and do not meet exactly, it is difficult to compute the shape for a flat in order to create smooth, tight, closed (if desired) corners. The part shown in FIG. 5 is such a part having a bend angle of less than 90° and a gap at both corners. In order to create the corner without the gap, as shown in FIG. 23, one or both of faces 26, 28 must be extended. Thus, the object is to extend the face(s) so that the faces meet exactly at an intersection line and there is an exact touching, i.e., the gap between the faces is closed. Alternatively, a user may elect to leave a gap of a selected size between corners.

Figure 22:
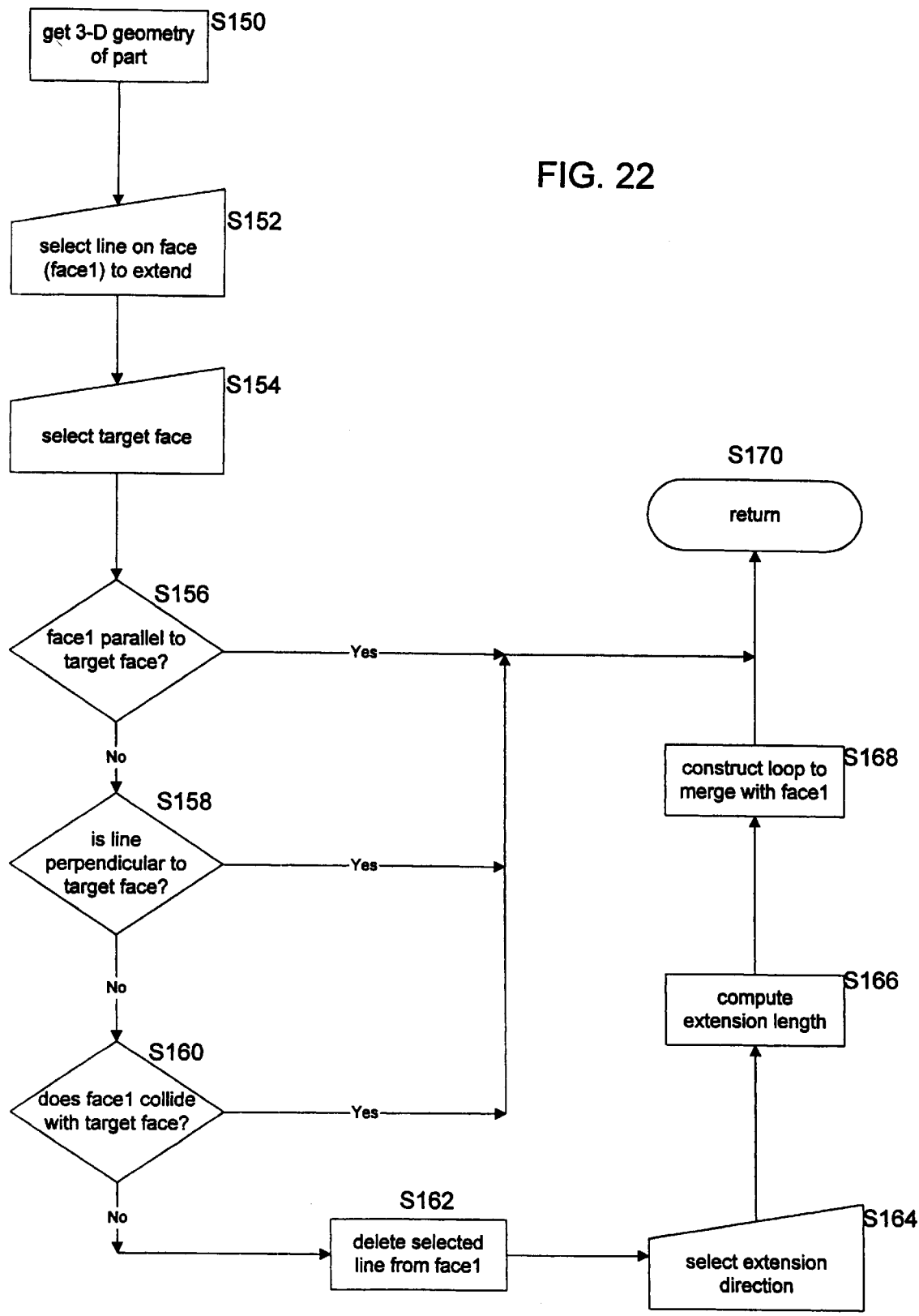
FIG. 22 is a flow diagram of a preferred process for resolving a face extend problem according to the present invention.

An exemplary process for extending a face according to a preferred embodiment of the present invention is now explained with reference to FIG. 22. At step S150, the appropriate function gets the 3-D geometry of the folded part. At S152, a user selects a line on a face (face 1) which will be extended. At this point, a user may select a line on either face or both faces. The line defines the side of the face the user wishes to extend. If a line is selected on both faces, the following process will be repeated for each line selected. However, the following description will assume that only one line is selected, i.e., only one face is extended.

At step S154, the user selects a target face to which face 1 will extend. The selected target face defines the target plane. At this point, three feasibility checks are performed to determine if the user selected extension is possible. At step S156, a check is made as to whether face 1 is parallel to the target face. If face 1 is not parallel to the target face at step S158, it is determined whether the selected line is perpendicular to the target face. If the result is negative, at step S160 it is determined whether face 1 collides with the target face. If the result is yes at either steps S156, S158 or S160, the face extension cannot occur and the control returns to the calling function at step S170. However, if the result is negative for all three feasibility checks, at step S162, the selected line is deleted and the process of creating three new lines begins.

First, the extension direction must be selected by a user at step S164. In a preferred embodiment, the direction may be either perpendicular or tangent to the previously selected line. In a preferred embodiment, the default extension direction is tangent. However, if the tangent is parallel to the target face, the tangent direction may not be used. Next, at step S166 the extension length is calculated. The extension length is calculated as the distance from the target plane to each end point of the previously selected line. Thus, with the extension direction and the extension length, two new points can be calculated such that the two new points are on the plane of the target face. If the selected extension direction is tangent, the new points are a continuation of the edges 29, 30 of face 1 to the target face. Otherwise, the new points are perpendicular to the user selected line and are in the plane of the target face.

Figure 24:
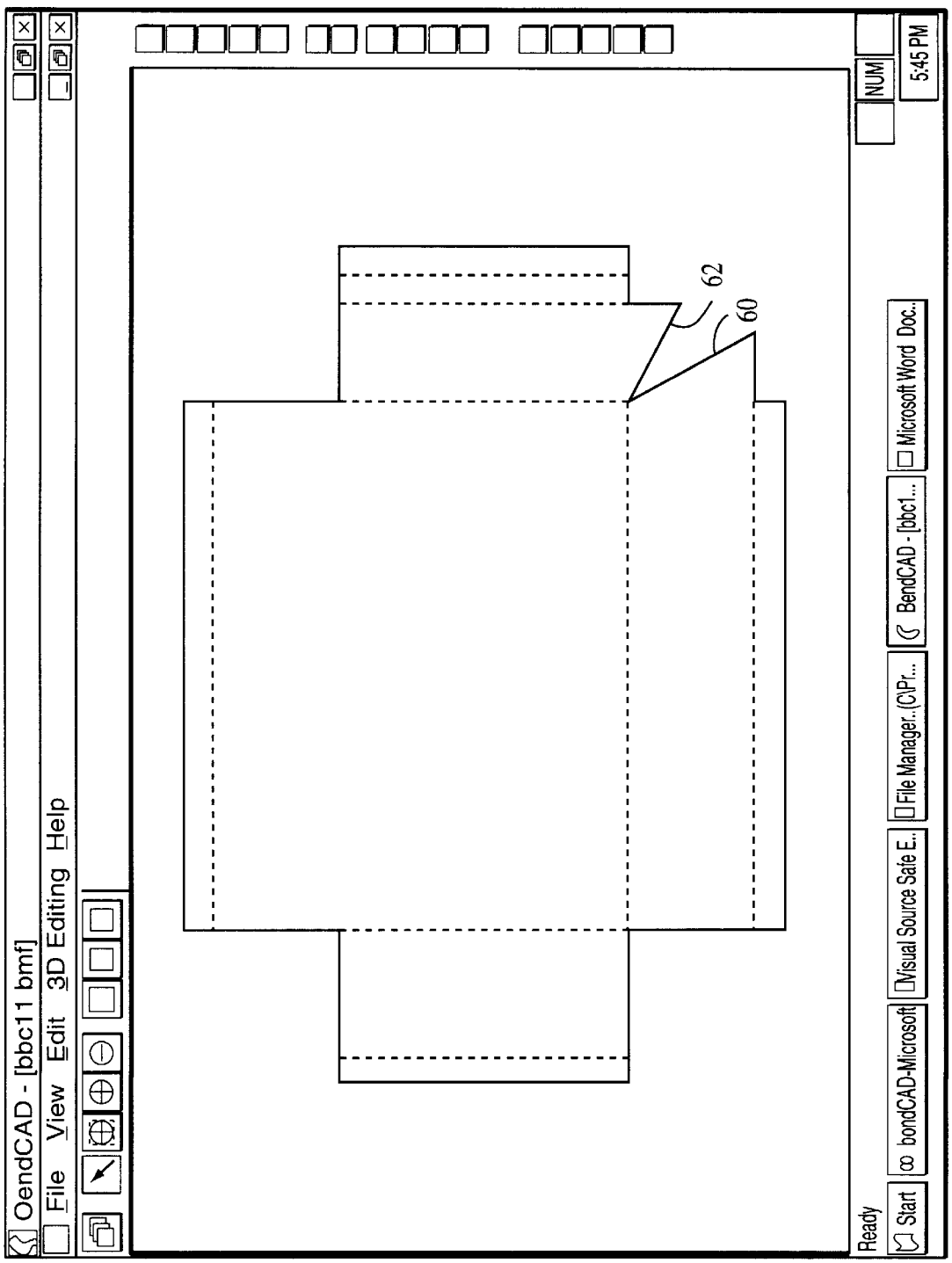
FIG. 24 is an illustration of a flat sheet metal part, for bending into the part shown in FIG. 23, designed using a system of the present invention.

At step S168 a loop is constructed with the two new points and the end points of the originally selected line. The loop is merged with face 1 resulting in a new face 1, attaining a corner without a gap, as illustrated in FIG. 23. FIG. 24 shows the shape of the flat required to obtain the part shown in FIG. 23. In particular, note the cut lines 60, 62 which result from the logic process just described. After the loop is merged with face 1, at step S170 the control returns to the calling function. In the example shown in FIG. 24, both faces were extended, in contrast to the single face described above as being extended.

The advantages of the present invention are that professional looking parts can be designed quickly and efficiently. The specifications of the flat can now be quickly and inexpensively calculated.

While the invention has been described with reference to several preferred embodiments, it is understood that the words which have been used are words of description and illustration, rather than words of limitations. Changes may be made, within the purview of the appended claims, as presently stated and as amended, without departing from the scope and spirit of the invention and its aspects. Although the invention has been described with reference to particular means, materials and embodiments, the invention is not intended to be limited to the particulars disclosed herein; rather, the invention extends to all functionally equivalent structures, methods and uses, such as are within the scope of the appended claims.

What is claimed:

1. An apparatus for resolving a collision between a first bendline and a second bendline of a sheet metal part represented by a 3-D model, the bendlines colliding with one another as a result of a 2-D model of a flat sheet metal part designed on a CAD system being folded into the 3-D model displayed on the CAD system, the apparatus comprising:
   a detector that detects the collision between the bendlines in the 3-D model;
   a 3-D polyline computing system that computes 3-D polylines corresponding to a collision area;
   a 2-D polyline computing system that computes 2-D polylines from the 3-D polylines;
   a cut-loop system that computes a cut-loop based upon the 2-D polylines; and
   a refining system that uses the cut-loop to remove a portion of the 2-D model of the flat sheet metal part, creating a modified 2-D model, so that a two radius corner results in a revised 3-D model where the bendlines had intersected when the modified 2-D model is folded into the revised 3-D model.

2. An apparatus for resolving a collision between a first face and a second face of a sheet metal part represented by a 3-D model, the faces colliding with one another as a result of a 2-D model of a flat sheet metal part designed on a CAD system being folded into the 3-D model displayed on the CAD system, the apparatus comprising:
   a detector that detects each collision between the faces becoming adjacent when the 2-D model is folded into the 3-D model;
   a classifying system that determines whether the colliding faces are parallel;
   a bounding box computing system that computes a first bounding box of a first collision area corresponding to the first face, and a second bounding box of a second collision area corresponding to the second face, the bounding boxes completely containing all points in the collision areas; and
   a re-design system that calculates a trim-loop based upon the first and second bounding boxes, the model being trimmed by the trim-loop so that the collision is eliminated and a smooth transition results between the faces after bending a re-designed 2-D model into a revised 3-D model.

3. A method for resolving a collision between a first face and a second face of a sheet metal part represented by a 3-D model, the faces colliding with one another as a result of a 2-D model of a flat sheet metal part designed on a CAD system being folded into the 3-D model displayed on the CAD system, the method comprising:
   detecting each collision between the faces becoming adjacent when the 2-D model is folded into the 3-D model;
   determining whether the colliding faces are parallel;
   computing a first bounding box of a first collision area corresponding to the first face, and a second bounding box of a second collision area corresponding to the second face, the bounding boxes completely containing all points in the collision areas; and
   re-designing the 2-D model based upon a trim-loop calculated based upon the first and second bounding boxes, the 2-D model being trimmed by the trim-loop, so that the collision is eliminated and a smooth transition results between the faces after bending the re-designed 2-D model into a revised 3-D model.

4. A method for extending at least one of two faces of a sheet metal part, represented by a 3-D model, so that a gap between the two faces is reduced, the extension being reflected in the design of a 2-D model of the sheet metal part so that when the 2-D model is folded into the 3-D model, the gap is reduced, the method comprising:
   selecting an edge of a first face to extend;
   selecting a target face to which the first face will be extended, the target face defining a target plane;
   selecting an extension direction along which the edge of the first face will be extended to the target face; and
   designing a modified part that reduces the gap based on the selected edge, target face, and extension direction.

5. The method of claim 4, in which the designing eliminates the gap.

6. The apparatus of claim 1, in which the 2-D polyline computing system compensates for an amount of expansion/shrinking of the part during a bending operation.

7. The apparatus of claim 1, in which the 3-D polyline computing system computes the 3-D polyline by modeling each bend line as an imaginary cylinder to analyze intersection points on the colliding bendlines.

8. The apparatus of claim 2, in which the bounding box computing system further comprises an extended bounding box computing system that computes a first extended bounding box from the first bounding box, and a second extended bounding box from the second bounding box.

9. The apparatus of claim 8, in which the re-design system computes a trim-loop for each face based upon the respective extended bounding box and user input parameters relating to selection of cut type.

10. The apparatus of claim 9, in which the re-design system computes a first intersection area between the first face and the second face's trim-loop and removes the first intersection area from the first face, and computes a second intersection area between the second face and the first face's trim-loop and removes the second intersection area from the second face.

11. The apparatus of claim 9 in which the cut type comprises one of a 45 degree cut and a diagonal cut.

12. The apparatus of claim 2, in which the classifying system classifies the collision into at least one of face overlap, setback and 3-D trim and controls the re-design system in accord with the classification of the collision.

13. The apparatus of claim 12, in which, if the collision is classified as one of 3-D trim and setback, the re-design system calculates a trim-loop for each face including the respective collision area bounding box and an area on the respective face to one side of the collision area bounding box, the apparatus further comprising a cutting system that cuts the intersection of the trim-loop and the face to create a cut out piece, and a testing system that tests each cut out piece for an intersection with a hole and bend line in the 3-D part model.

14. The apparatus of claim 13, in which the re-design system modifies each trim-loop that is near a bend line.

15. The apparatus of claim 14 wherein if the collision is classified as setback, the apparatus further comprises a comparator that compares each cut out piece with a predetermined multiple of the sheet metal's thickness.

16. The apparatus of claim 14 wherein if the collision is classified as 3-D trim, the apparatus further comprises an enlarging system that enlarges each trim-loop so that the trim-loop is larger in one dimension than a length and width of the colliding face.

17. The method of claim 4, in which the designing further comprises calculating a loop based on end points of the selected edge of the first face, the selected extension direction and the selected target face, and calculating a new face including the first face and the loop.

18. The method of claim 4, in which the extension direction comprises one of a tangent to the first face and a normal to the first face.

19. A method for resolving a collision between a first bendline and a second bendline of a sheet metal part represented by a 3-D model, the bendlines colliding with one another as a result of a 2-D model of a flat sheet metal part designed on a CAD system being folded into the 3-D model displayed on the CAD system, the method comprising:

detecting the collision between the bendlines in the 3-D model;

computing 3-D polyline corresponding to a collision area;

computing 2-D polylines from the 3-D polylines;

computing a cut-loop from the 2-D polylines; and refining the 2-D model by using the cut-loop to remove a portion of the 2-D model of the flat sheet part so that a two radius corner results in a revised 3-D model where the bendlines intersected, when the refined model is folded into the revised 3-D model.

* * * * *

UNITED STATES PATENT AND TRADEMARK OFFICE
CERTIFICATE OF CORRECTION

PATENT NO. : 6,144,896
DATED : November 7, 2000
INVENTOR(S) : K. Kask et al.

It is certified that error appears in the above-identified patent and that said Letters Patent is hereby corrected as shown below:

<u>Column 20,</u>
Line 24, "polyline" should be -- polylines --.
Line 28, after "sheet" insert -- metal --.

Signed and Sealed this

Eighth Day of January, 2002

JAMES E. ROGAN
*Director of the United States Patent and Trademark Office*

*Attest:*

*Attesting Officer*